US009484701B2

(12) United States Patent
Particka et al.

(10) Patent No.: US 9,484,701 B2
(45) Date of Patent: Nov. 1, 2016

(54) QUICK RELEASE PUSH FEED GUIDE AND TOOL SUPPORT FOR TERMINAL APPLICATOR

(71) Applicant: Odyssey Tool, L.L.C., Clinton Township, MI (US)

(72) Inventors: Douglas A. Particka, Snover, MI (US); George J. Tilli, Clinton Township, MI (US)

(73) Assignee: Odyssey Tool, LLC, Clinton Township, MI (US)

( * ) Notice: Subject to any disclaimer, the term of this patent is extended or adjusted under 35 U.S.C. 154(b) by 299 days.

(21) Appl. No.: 14/273,935

(22) Filed: May 9, 2014

(65) Prior Publication Data

US 2014/0245602 A1 Sep. 4, 2014

Related U.S. Application Data

(60) Continuation-in-part of application No. 14/037,716, filed on Sep. 26, 2013, now Pat. No. 8,973,256, which is a division of application No. 12/913,447, filed on Oct. 27, 2010, now Pat. No. 8,544,166.

(60) Provisional application No. 61/280,141, filed on Oct. 30, 2009.

(51) Int. Cl.

*B23P 19/00* (2006.01)
*H01R 43/042* (2006.01)
*H01R 43/055* (2006.01)

(52) U.S. Cl.

CPC ........ *H01R 43/055* (2013.01); *Y10T 29/49174* (2015.01); *Y10T 29/5327* (2015.01); *Y10T 29/53235* (2015.01); *Y10T 29/53261* (2015.01)

(58) Field of Classification Search

CPC .................. Y10T 29/53213; Y10T 29/53235; Y10T 29/53261; Y10T 29/49174; Y10T 29/5327; Y10T 29/49826; H01R 43/00

USPC ....... 29/753, 33 M, 748, 751, 755, 760, 788, 29/863; 72/184, 413, 712; 403/325, 349

See application file for complete search history.

(56) References Cited

U.S. PATENT DOCUMENTS

| | | | | |
|---|---|---|---|---|
| 6,327,775 | B1 | 12/2001 | Oishi et al. | |
| 6,367,148 | B1 * | 4/2002 | Caveney | H01R 43/055 29/33 M |
| 7,117,713 | B2 * | 10/2006 | Lu | H01R 43/055 29/566.2 |
| 7,448,823 | B2 | 11/2008 | Silva | |
| 7,565,735 | B2 | 7/2009 | Garner, Jr. | |
| 8,544,166 | B2 | 10/2013 | Particka et al. | |
| 8,578,597 | B2 | 11/2013 | Dobson et al. | |
| 2009/0255112 | A1 | 10/2009 | Garner, Jr. | |

* cited by examiner

*Primary Examiner* — Thiem Phan

(74) *Attorney, Agent, or Firm* — Vivacqua Law, PLLC; Thomas J. Krul; Raymond J. Vivacqua

(57) ABSTRACT

An electrical terminal applicator system including a feed guide and tool support assembly defining a one-piece member includes a stock guide portion joined to a tool receiving portion. A motor is positioned adjacent to the feed guide and tool support assembly. A drive shaft received in a bore of the stock guide portion is rotated about a longitudinal axis of the drive shaft within the bore by operation of the motor. A tool assembly is mounted on the tool receiving portion and located downstream of the stock guide portion and the drive shaft. The drive shaft when rotated about the longitudinal axis of the drive shaft is positioned to engage a terminal holder strip having multiple electrical terminals to push the terminal strip holder toward the tool assembly.

12 Claims, 32 Drawing Sheets

QUICK RELEASE PUSH FEED GUIDE AND TOOL SUPPORT FOR TERMINAL APPLICATOR

CROSS-REFERENCE TO RELATED APPLICATIONS

This application is a continuation-in-part of U.S. patent application Ser. No. 14/037,716 filed on Sep. 26, 2013 (pending), which claims priority to U.S. patent application Ser. No. 12/913,447 filed on Oct. 27, 2010, which issued as U.S. Pat. No. 8,544,166 on Oct. 1, 2013, which claims the benefit of U.S. Provisional Application No. 61/280,141, filed on Oct. 30, 2009. The entire disclosures of the above applications are incorporated herein by reference.

FIELD

The present disclosure relates to terminal feed and tool support components for electrical terminal applicators.

BACKGROUND

This section provides background information related to the present disclosure which is not necessarily prior art.

Dies connected to and reciprocated by a press are commonly used to attach an electrical terminal to a wire by crimping the terminal to both the insulation and a stripped portion of the wire. Electrical terminals are commonly provided on a reel attached to a tape or carrier strip which positions successive terminals at a predefined, equal spacing. The die commonly includes a feed platen or plate which receives the carrier strip and aligns each terminal with a tool portion. The tool portion commonly includes an insulation stripper, first and second crimp tools, and first and second anvils each vertically aligned under one of the first or second crimp tools. An incremental terminal feeding member such as a feed finger can also be used to incrementally feed a next-in-line terminal from the feed platen to the tool portion with each stroke of a ram provided with the press.

A first connection is commonly created by the first crimp tool and first anvil by crimping the terminal and a stripped wire portion. A second connection is created by the second crimp tool and second anvil by crimping tabs of the terminal about an insulated portion of the wire proximate to the stripped wire portion. Each type and size of terminal commonly requires a separate feed platen or adjustment of an alignment portion of the feed platen to properly align the terminals with the tool portion. Each type and size of terminal also requires a different tool portion. To eliminate the need to separately install a new feed platen, and tool portion, and then align and test these components, terminal installers commonly remove and replace the entire die, feed platen, and tool portion together when changing an assembly line from a first to a second size or type of terminal.

In addition, known dies and tool portions "pull" the carrier strip from a carrier strip contact position located downstream of the tool portion having the crimp tools, the anvils and the crimp tools. The downstream contact position used to pull the carrier strip requires a carrier strip design that creates a "scrap carrier" portion after the terminal portion has been removed. Carrier strip designs wherein terminal portion removal creates no scrap carrier portion therefore cannot be pulled using a pull type die and tool portion, which further increases the number and type of die and tool portions that must be provided.

SUMMARY

This section provides a general summary of the disclosure, and is not a comprehensive disclosure of its full scope or all of its features.

According to several embodiments, an electrical terminal applicator system including a feed guide and tool support assembly defining a one-piece member including a stock guide portion joined to a tool receiving portion. A motor is positioned adjacent to the feed guide and tool support assembly. A drive shaft received in a bore of the stock guide portion is rotated about a longitudinal axis of the drive shaft within the bore by operation of the motor. A tool assembly is mounted on the tool receiving portion and located downstream of the stock guide portion and the drive shaft. The drive shaft when rotated about the longitudinal axis of the drive shaft is positioned to engage a terminal holder strip having multiple electrical terminals to push the terminal strip holder toward the tool assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
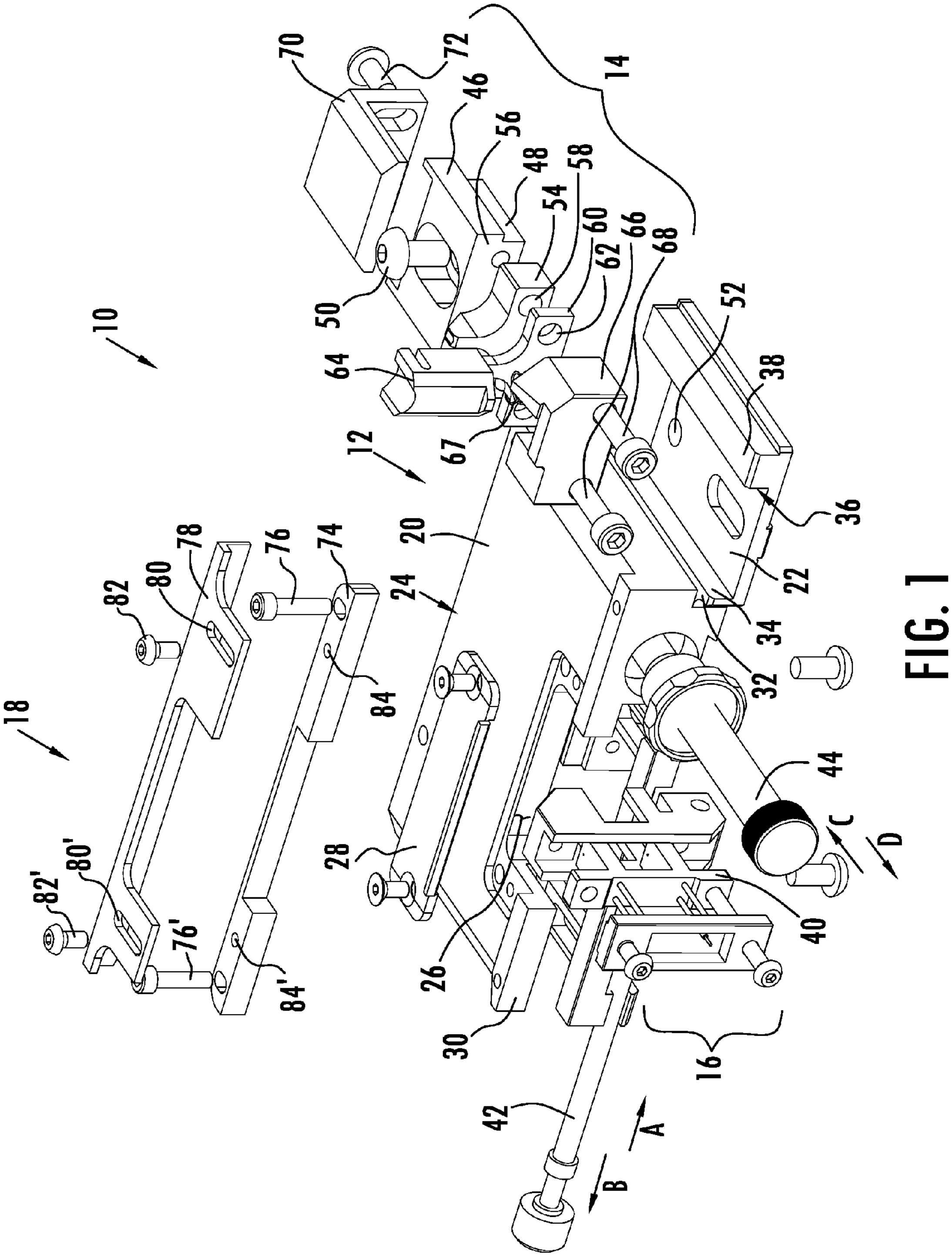
FIG. 1 is a front left perspective assembly view of a feed guide and tool support assembly having a one-piece member of the present disclosure.

Referring to FIG. 1, a feed guide and tool support assembly 10 includes a one-piece member 12 which can have a releasably connected tool assembly 14, an adaptor portion 16, and a releasable rail portion 18. One-piece member 12 includes a stock guide portion 20 fixed directly to a tool receiving portion 22 such as by fastening, non-releasable connection, or being together created as a homogeneous member. The stock guide portion 20 includes a plate or stock guide platen 24 which defines a substantially planar surface. A platen opening 26 is created in stock guide platen 24 to permit access to adaptor portion 16. A cover plate 28 can be fastenably connected to stock guide portion 20 to cover platen opening 26. A guide rail 30 can be fixed directly to, or homogeneously or non-releasably connected to and extend upwardly from stock guide platen 24.

Stock guide portion 20 can be homogeneously connected to tool receiving portion 22 at a connecting portion 32. Connecting portion 32 provides a first alignment surface 34. An opposed second alignment surface 36 is spaced from and oriented parallel to first alignment surface 34. Second alignment surface 36 is created in a containment wall 38.

Figure 11:
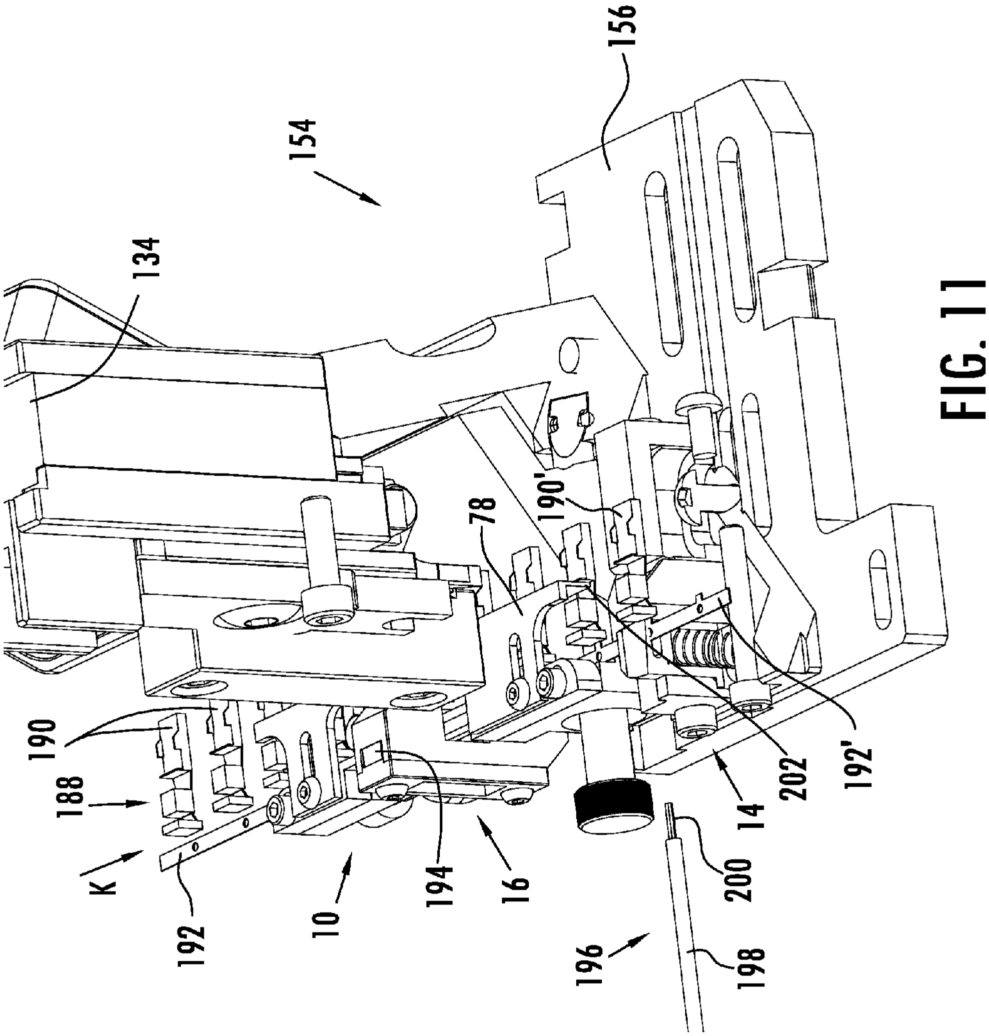
FIG. 11 is a left front perspective view of an assembly of an feed guide and tool support assembly on a die during operation.

Adaptor portion 16 includes a sensor mounting portion 40 adapted to releasably receive a sensor such as an optical sensor which will be further described in reference to FIG. 11. An adjustment stud 42 is partially received through adaptor portion 16 which permits the adaptor portion 16 to be moved in a first direction “A” and in an opposite second direction “B”. An adjustment device 44 can also be provided with feed guide and tool support assembly 10 which can be axially rotated to horizontally move one-piece member 12 for fine horizontal adjustment in either of an inward horizontal direction “C” or an outward horizontal direction “D” by opposite axial rotation of adjustment device 44.

According to several embodiments tool assembly 14 can include a tool mount block 46 which has opposed parallel faces 48, 48' (only parallel face 48 is visible in this view) which slidingly contact second alignment surface 36 and first alignment surface 34 respectively. When a desired position of tool assembly 14 with respect to tool receiving portion 22 is reached, a block fastener 50 inserted through tool mount block 46 is received in a threaded aperture 52 of tool receiving portion 22 to releasably fix a position of tool mount block 46. Several tool items can be releasably fastened to tool mount block 46, including a conductor anvil 54 positioned in contact with an abutment surface 56 of tool mount block 46. Conductor anvil 54 has a plurality of through apertures 58. An insulation anvil 60 is positioned in abutment with conductor anvil 54 and includes a plurality of apertures 62 each coaxially aligned with individual ones of the through apertures 58. A cutter 64 is slidably received in a cutter retainer 66 and biased by a cutter spring 67. Cutter retainer 66 is positioned in abutment with insulation anvil 60 and a plurality of tool assembly fasteners 68 are inserted sequentially through cutter retainer 66, through apertures 62 of insulation anvil 60, and through apertures 58 of conductor anvil 54 to releasably fasten these components to tool mount block 46. On an opposite side of tool mount block 46 with respect to conductor anvil 54, a terminal straightener 70 is fastenably connected using a plurality of fasteners 72. All of the components of tool assembly 14 which are connected to mount tool block 46 are fastened to tool receiving portion 22 using block fastener 50 such that only a single fastener is required to remove or install tool assembly 14. Tool assembly 14 when fastenably connected to tool receiving portion 22 can also be retained and the entire assembly of tool assembly 14 and one-piece member 12 can be installed or removed using only a single fastener 155, shown and described in reference to FIGS. 8-10 and 14.

A spacer 74 can be fastenably connected to stock guide platen 24 of stock guide portion 20 using a plurality of spacer fasteners 76, 76'. A rail 78 is releasably fastened to spacer 74 such that rail 78 can be adjustably positioned with respect to homogeneous guide rail 30. To permit horizontal adjustment of rail 78, elongated apertures 80, 80' each receive a rail fastener 82, 82' for threaded engagement within a threaded aperture 84, 84' of spacer 74. All of the components depicted in FIG. 1 defining feed guide and tool support assembly 10 can be installed or removed as a single assembly by engagement or release of only single fastener 155 (shown and described in reference to FIGS. 8-10 and 14). According to further embodiments, one-piece member 12 can have tool receiving portion 22 and guide rail 30 non-releasably connected to stock guide portion 20.

Figure 2:
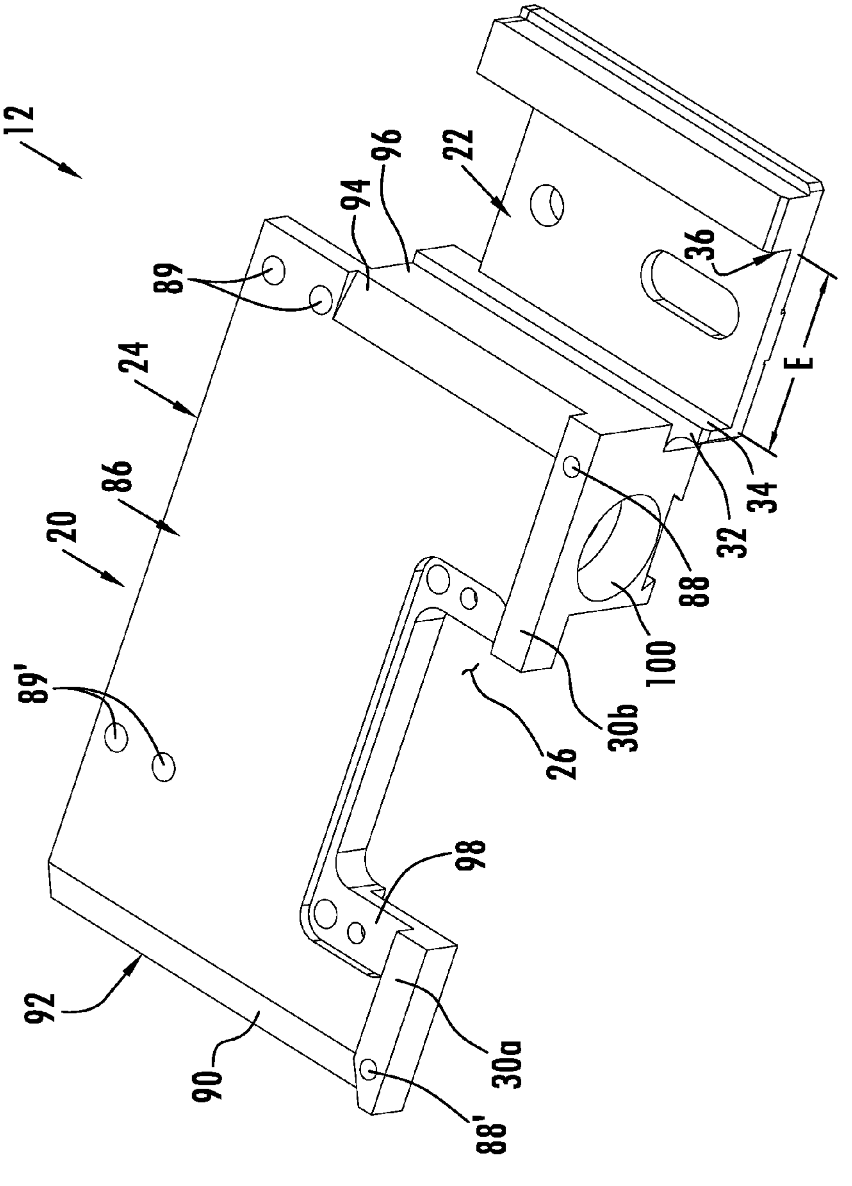
FIG. 2 is a top left perspective view of the one-piece member of FIG. 1.

Referring to FIG. 2 and again to FIG. 1, further features of one-piece member 12 include a planar surface 86 of stock guide platen 24 having guide rail 30 homogeneously extending therefrom. A plurality of fastener engagement apertures 88, 88' are created in guide rail 30, and a plurality of fastener engagement apertures 89 are created in planar surface 86 for connection of terminal guide members and the like. A first chamfer 90 is created at a terminal feed end 92 which is oppositely positioned with respect to a second chamfer 94 created at a terminal delivery end 96. A counterbore portion 98 is created at platen opening 26 such that cover plate 28 fully seats within counterbore portion 98 aligning a surface of cover plate 28 flush with planar surface 86. The homogeneous guide rail 30 is separated into a first guide rail portion 30*a* and a second guide rail portion 30*b* on opposite sides of platen opening 26. A clearance aperture 100 is created to receive adjustment device 44. Connecting portion 32 homogeneously connects stock guide portion 20 to tool receiving portion 22 proximate to terminal delivery end 96. A tool receiving opening width "E" is defined between first and second alignment surfaces 34, 36 which provide a sliding fit for opposed parallel faces 48, 48' of tool mount block 46.

Figure 3:
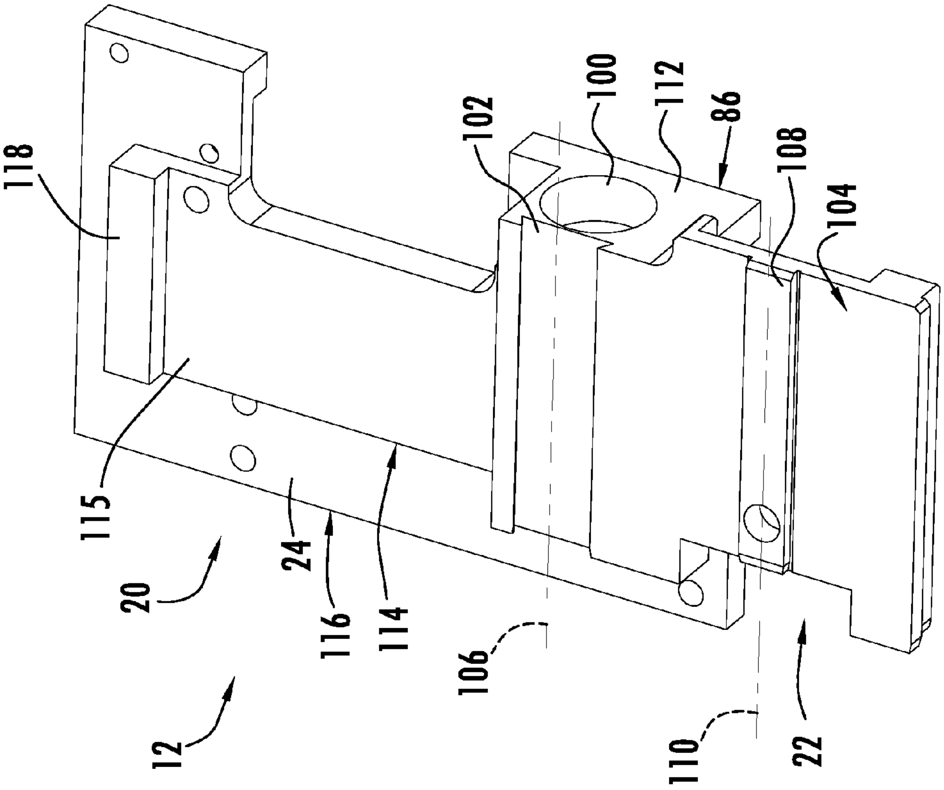
FIG. 3 is a bottom perspective view of the one-piece member of FIG. 2.

Referring to FIG. 3, a female slot 102 is created in a planar support surface 104 which is oppositely facing with respect planar surface 86. According to several embodiments female slot 102 can be a rectangular shaped slot or a dovetail shaped slot aligned on a slot longitudinal axis 106. A male key member 108 can extend away from planar support surface 104 and opposite to the configuration of female slot 102 with respect to planar support surface 104. Male key member 108 is axially aligned on a key member longitudinal axis 110 which is aligned parallel with slot longitudinal axis 106. Male key member 108 can have a rectangular shape or a dovetail shape to correspond to the shape of female slot 102. Guide rail 30 is homogeneously connected to stock guide platen 24 to permit machining or casting guide rail 30 transverse to both longitudinal axes 106 and 110 such that guide rail 30 is non-adjustable and therefore always oriented transverse to female slot 102 and male key member 108. Both the female slot 102 and clearance aperture 100 are created in an adjustment device receiving portion 112 of one-piece member 12. Male key member 108 extends away from planar support surface 104 of tool receiving portion 22. A rear facing reinforcement wall 114 of a raised reinforcement portion 115 is oriented parallel with but spatially separated from a rear facing platen face 116 of stock guide portion 20. A secondary support wall 118 extends below and away from raised reinforcement portion 115 to create a support surface for stock guide portion 20 in addition to planar support surface 104.

Figure 4:
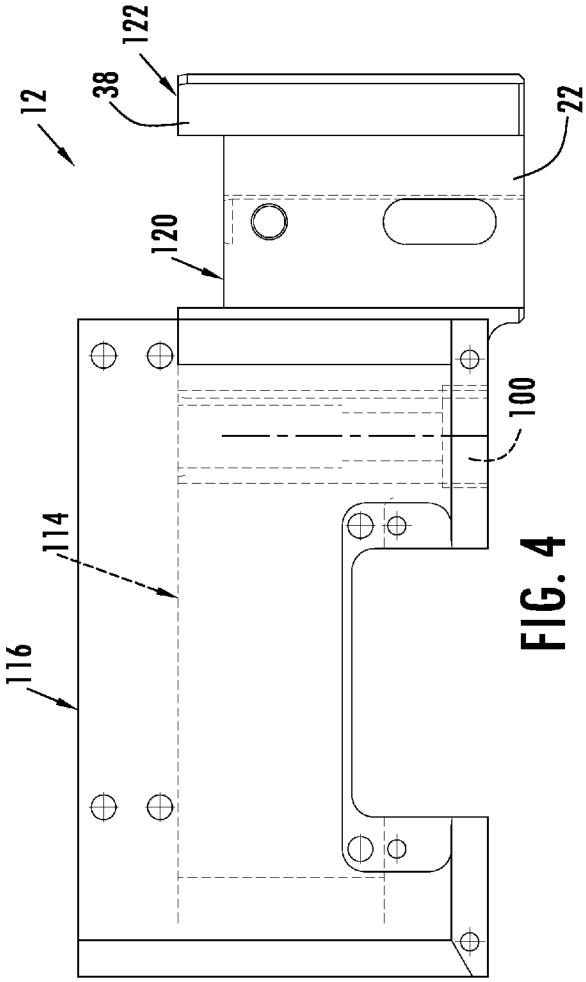
FIG. 4 is a top plan view of the one-piece member of FIG. 2.

Referring to FIG. 4 and again to FIG. 1, a rear tool receiving portion face 120 of tool receiving portion 22 is recessed with respect to a wall end face 122 of containment wall 38. The rear tool receiving portion face 120 recess permits positioning terminal straightener 70 partially within the recess which prevents rotation of terminal straightener 70.

Figure 5:
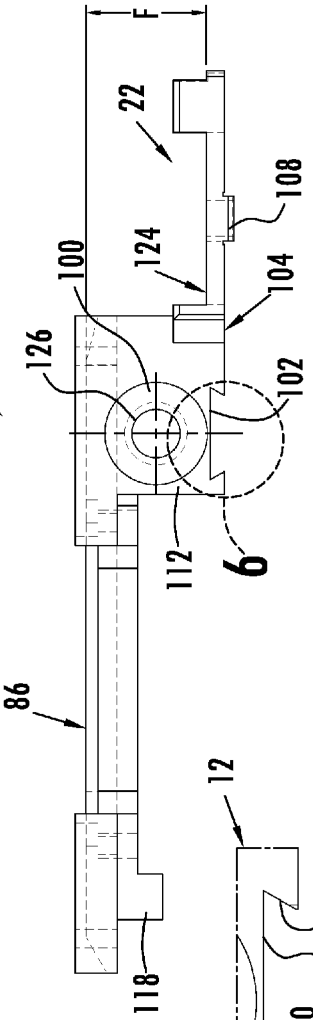
FIG. 5 is a front end elevational view of the one-piece member of FIG. 2.

Referring to FIG. 5 and again to FIG. 1, tool receiving portion 22 includes a tool receiving portion surface 124 which is substantially planar and is oriented parallel with planar surface 86. Tool receiving portion surface 124 is positioned below planar surface 86 by a separation distance "F" which provides space for tool assembly 14 to be received and slidably engaged with tool receiving portion surface 124. A threaded aperture 126 is further created in adjustment device receiving portion 112 to threadably receive adjustment device 44.

Figure 6:
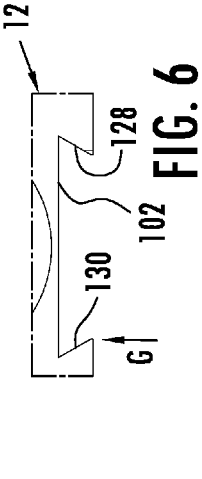
FIG. 6 is a front end elevational view of area 6 of FIG. 5.

Referring to FIG. 6, as previously noted female slot 102 can be created as a dovetail-shaped member. A first angled wall 128 is oppositely oriented with respect to an opposed second angled wall 130 to create the dovetail shape. By employing a dovetail-shaped female slot 102, one-piece member 12 is precluded from displacement in an upward direction "G" when a male dovetail shaped member (not shown in this view) is slidingly received within female slot 102.

Figure 7:
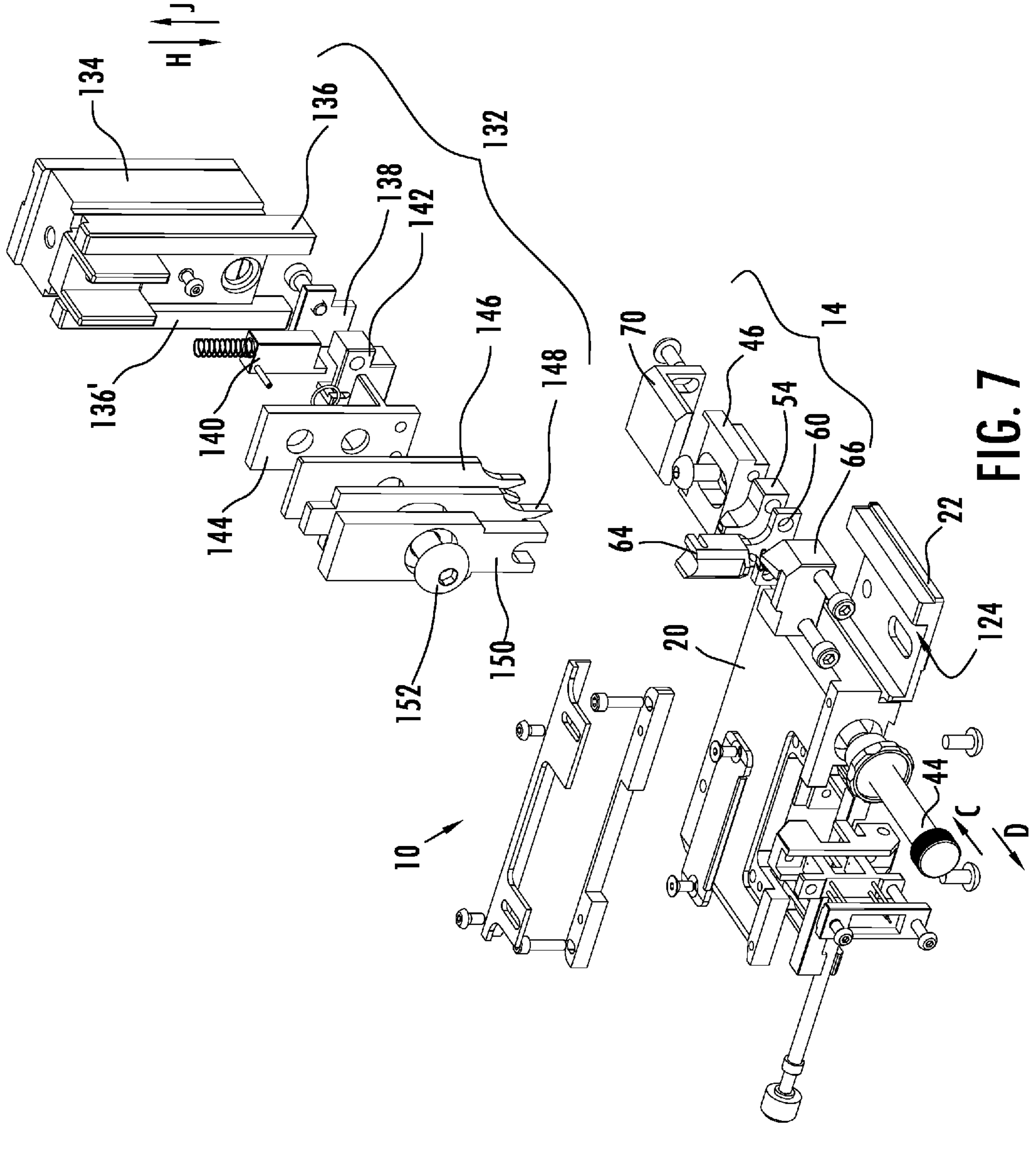
FIG. 7 is a front left perspective assembly view of the feed guide and tool support assembly of FIG. 1 and an upper tool assembly.

Referring to FIG. 7, feed guide and tool support assembly 10 can be used in conjunction with an upper tool assembly 132. According to several embodiments upper tool assembly 132 can include a ram 134 having first and second tool holders 136, 136'. First and second tool holders 136, 136' receive a cover 138, a pressure pad 140, and a pressure pad retainer 142. A punch retainer 144 is positioned outward of pressure pad retainer 142 and fastenably receives a conductor punch 146, an insulation punch 148, and a cutter actuator 150. A punch assembly fastener 152 is used to fastenably retain each of the cutter actuator 150, insulation punch 148, and conductor punch 146 to the punch retainer 144. As known in the art, conductor punch 146 contacting conductor anvil 54 deflects a portion of a terminal about an electrical wire or stranded wire. Insulation punch 148 deflects a second portion of the terminal about an insulated portion of the wire assembly. Finally, cutter actuator 150 in communication with cutter 64 is used to separate an individual terminal after the operations performed by the conductor punch 146 and insulation punch 148. Each of the components of upper tool assembly 132 move in unison with ram 134 which is displaceable in each of a punch actuation direction "H" and a punch return direction "J". A single vertical displacement or operation of ram 134 includes motion in the punch actuation direction "H" followed by motion in the punch return direction "J". Each single operation acts to complete assembly of a single terminal and wire combination. Multiple different configurations of components, cutters and/or punches can also be provided with upper tool assembly 132.

Figure 8:
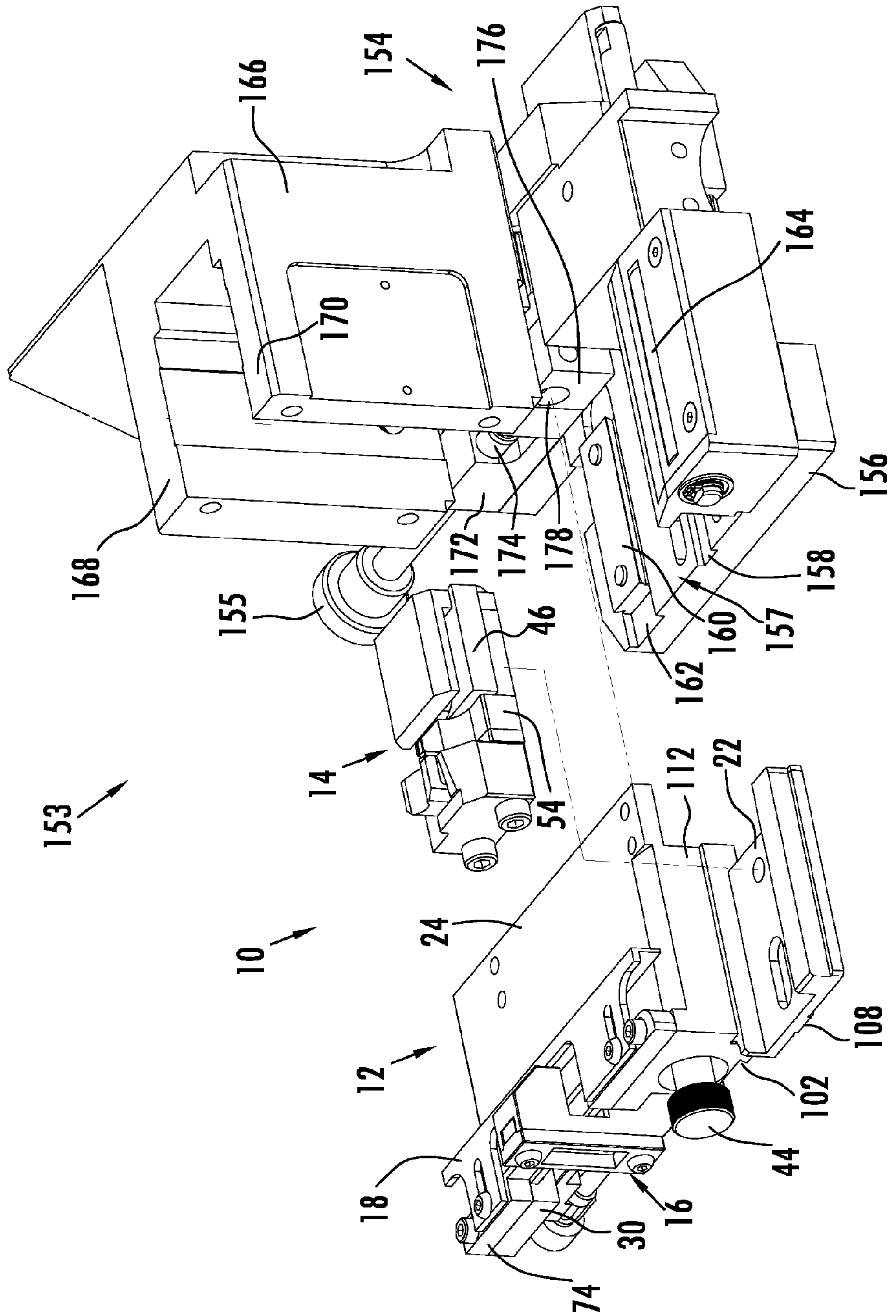
FIG. 8 is a left front perspective view of a feed guide and tool support assembly in position to be received by a die.

Referring to FIG. 8, according to several embodiments, the feed guide and tool support assembly 10 can be releasably connected to a die 154 for operation by a press (shown and described in reference to FIGS. 20, 21), forming an electrical terminal applicator system 153. One-piece member 12 includes stock guide portion 20 homogeneously connected to tool receiving portion 22. The single fastener 155 releasably connects the one-piece member 12 to the die 154. The feed guide and tool support assembly 10 can further include tool assembly 14 releasably secured to the tool receiving portion 22. The tool assembly 14 can include tool mount block 46 slidably positioned in and releasably fastened to the tool receiving portion 22, and at least one conductor anvil 54 releasably connected to the tool mount block 46 for crimping a terminal to a wire (shown and described in reference to FIG. 11).

FIG. 8 with continued reference to FIG. 7 further shows die 154 can include a die platen 156 having a plate portion 157 of the die 154 including a female slot 158 which slidably receives male key member 108 of tool receiving portion 22. A rectangular shaped portion of a male dovetail member 160 can be slidably received in a female slot 162 created in die platen 156 and fastenably connected to die platen 156 to fix its position. The dovetail portion of male dovetail member 160 is matingly received in female dovetail slot 102 of adjustment device receiving portion 112. An off-load alignment member 164 horizontally aligned with stock guide platen 24 provides horizontal support for completed wire/terminal components exiting feed guide and tool support assembly 10. A ram alignment member 166 slidably receives ram 134 between opposed first and second alignment walls 168, 170. A first apertured block 172 is connected to die platen 156 and threadably receives a threaded body portion 174 of single fastener 155. A second apertured block 176 connected to die platen 156 provides an alignment aperture 178 which receives an engagement end (not shown in this view) of adjustment device 44.

Figure 9:
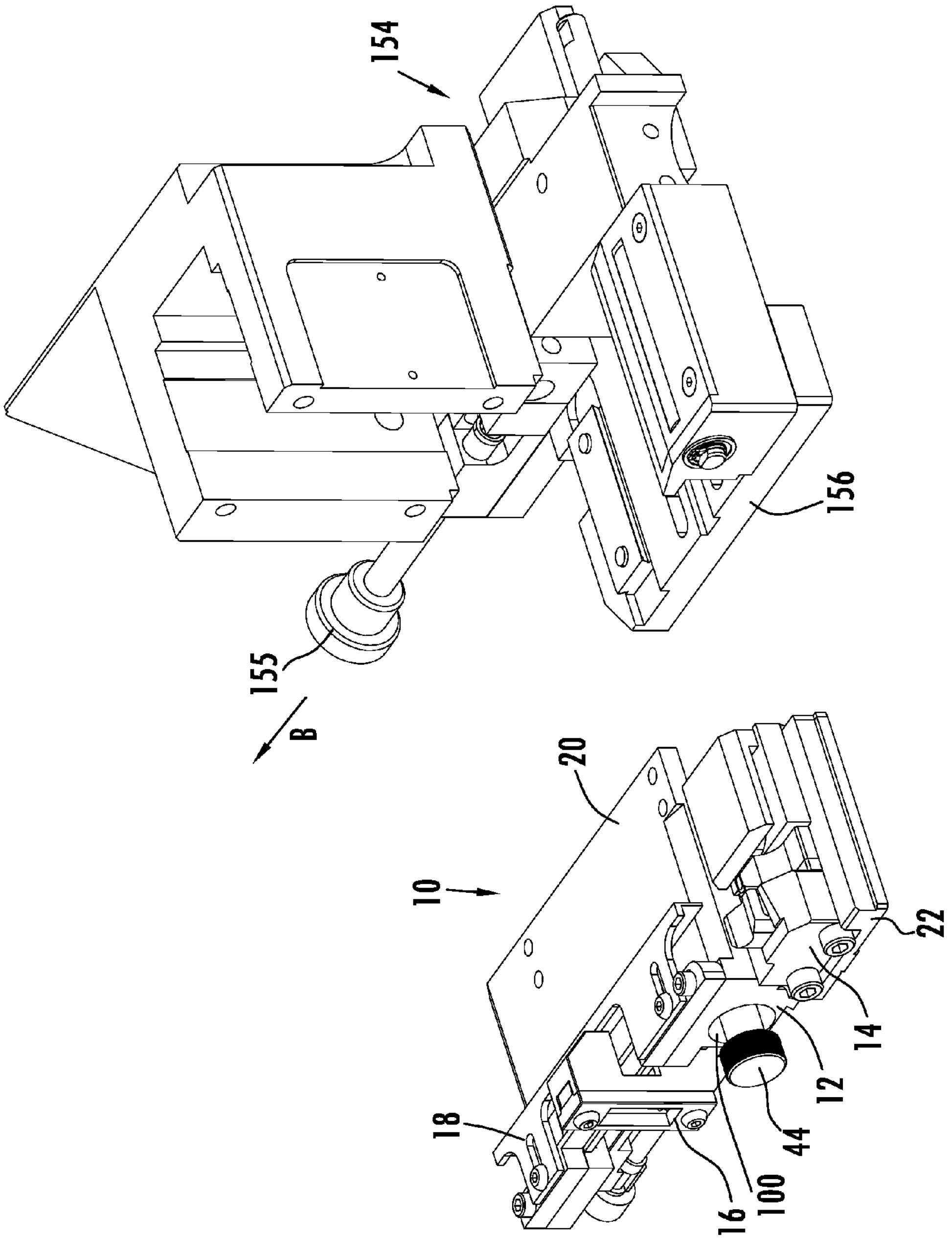
FIG. 9 is a left front perspective view of a feed guide and tool support assembly after removal from a die.

Referring to FIG. 9, with single fastener 155 retracted in the pin release or second direction "B", die platen 156 of die 154 is ready to slidably receive feed guide and tool support assembly 10. Feed guide and tool support assembly 10 can be releasably connected to or released from engagement with die 154 by operation of only single fastener 155. Feed guide and tool support assembly 10 can be completely assembled as shown to include one-piece member 12 having tool assembly 14 fastenably connected to tool receiving portion 22, and both adaptor portion 16 and releasable rail portion 18 fastenably connected to one-piece member 12, and further having stock guide portion 20 homogeneously connected to tool receiving portion 22. Adjustment device 44 can also be included with feed guide and tool support assembly 10 by positioning adjustment device 44 in clearance aperture 100 of one-piece member 12.

Figure 10:
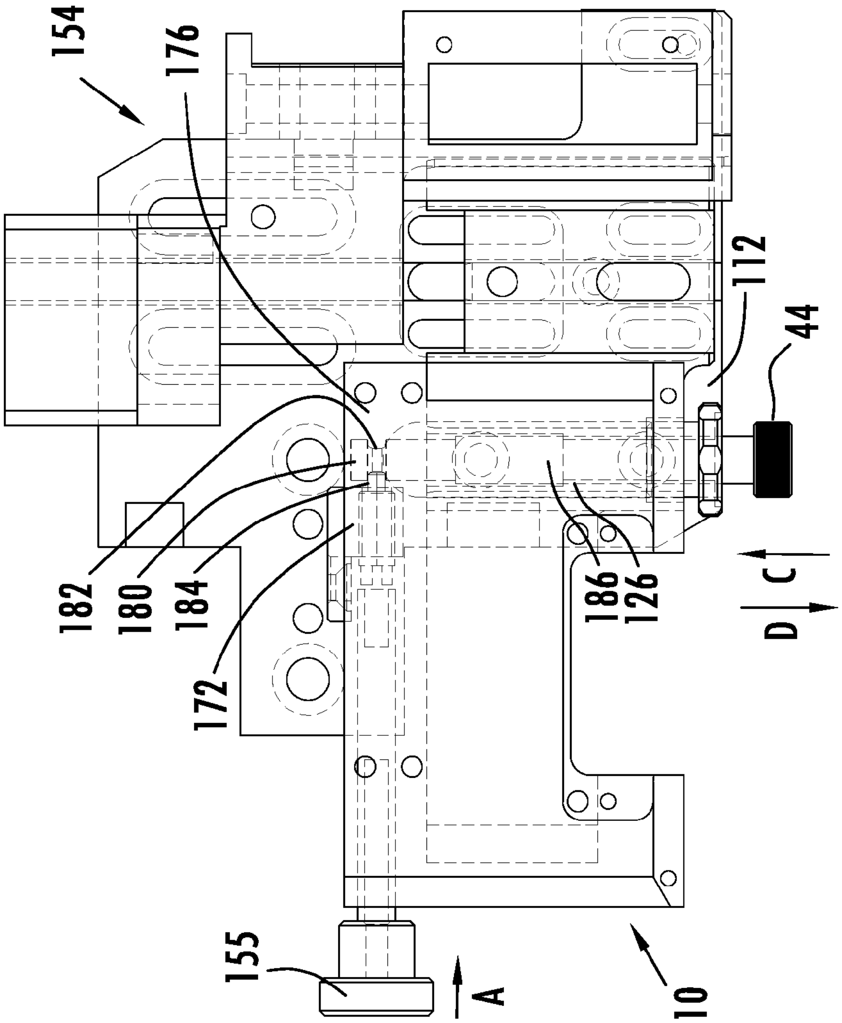
FIG. 10 is a top plan view of a feed guide and tool support assembly in an installed position on a die.

Referring to FIG. 10, feed guide and tool support assembly 10 is shown in an installed position on die 154 and single fastener 155 is inserted in the pin engagement or first direction "A" to retain feed guide and tool support assembly 10 in position. Adjustment device 44 is fully extended into second apertured block 176 until a terminal head 180 and a reduced diameter portion 182 of adjustment device 44 are aligned as shown. Single fastener 155 is fully inserted in the pin engagement direction "A" until a male extending pin 184 is received in reduced diameter portion 182. Male extending pin 184 thereafter prevents release of adjustment device 44 and feed guide and tool support assembly 10 by contact between male extending pin 184 and terminal head 180. Subsequent axial rotation of adjustment device 44 engages a threaded portion 186 of adjustment device 44 with threaded aperture 126 of adjustment device receiving portion 112 to horizontally adjust a position of feed guide and tool support assembly 10 with respect to die 154 in either the inward horizontal direction "C" or the outward horizontal direction "D".

Referring to FIG. 11, each feed guide and tool support assembly 10 when releasably connected to die platen 156 of die 154 can receive at least one size of terminal holder strip 188. Terminal holder strip 188 includes a plurality of electrical terminals 190 connected to a carrier strip 192. Terminal holder strip 188 is fed in a terminal feed direction "K". Each electrical terminal 190 can be identified as it passes a sensor 194, such as an optical sensor, mounted to adaptor portion 16, to initiate action of ram 134. Prior to initiation of a next ram cycle, a wire strip 196 having an insulation portion 198 and a stripped wire portion 200 is inserted into a next electrical terminal 190'. Each ram cycle (a downward and an opposite upward motion of ram 134) engages wire strip 196 to the next electrical terminal 190' and separates an assembly of the wire strip 196 and next electrical terminal 190' from a carrier strip portion 192'. According to several embodiments, a flange end 202 of rail 78 can be provided to help guide the plurality of electrical terminals 190.

Figure 12:
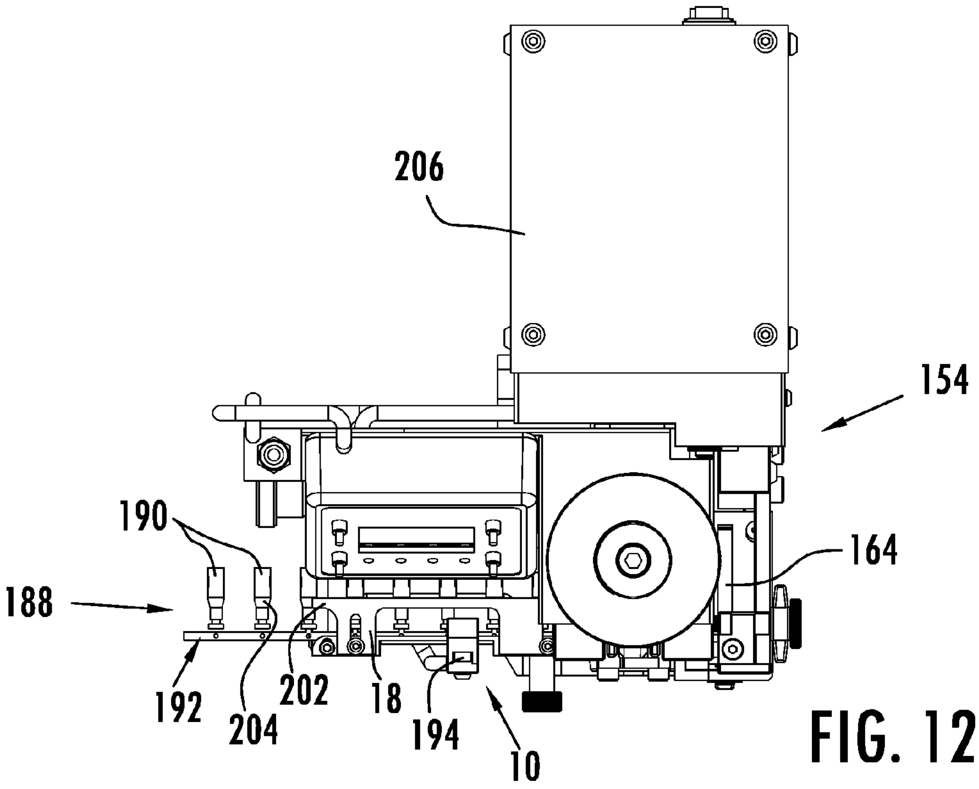
FIG. 12 is a top plan view of the assembly of FIG. 11.

Referring to FIG. 12, each of the electrical terminals 190 can include an alignment recess 204 which aligns with the flange end 202 of rail 78 to guide the plurality of electrical terminals 190. Die 154 can also include an electrical control box 206 which provides electrical control circuitry for electrical programming of die operation.

Figure 13:
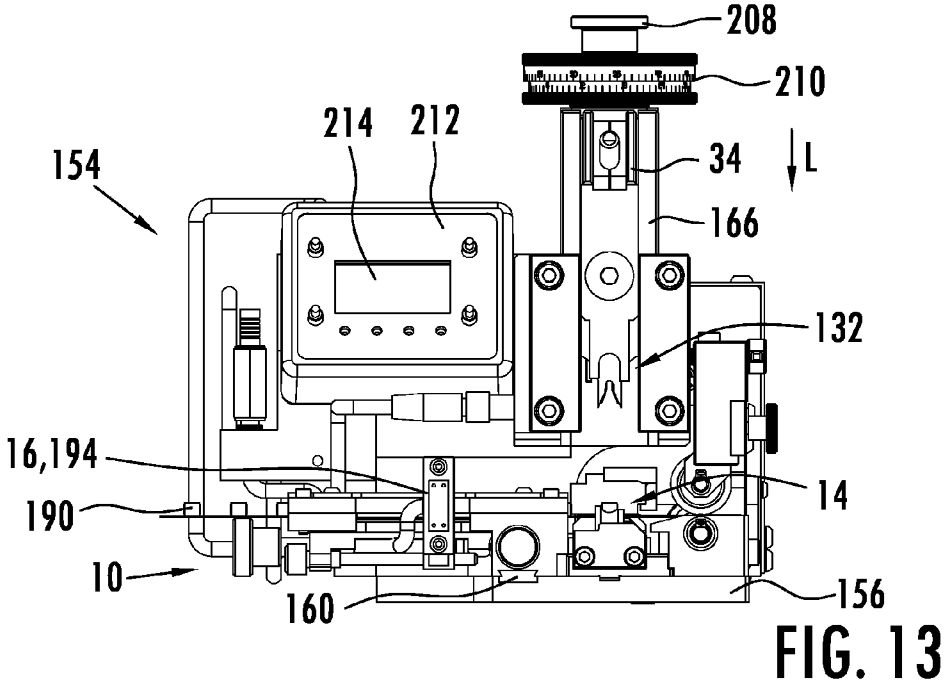
FIG. 13 is a front elevational view of the assembly of FIG. 11.

Referring to FIG. 13 and again to FIG. 12, a force transfer member 208 connected to ram 134 receives the force created by a press (shown and described in reference to FIGS. 20, 21) to drive ram 134 in a downward driving direction "L". A rotary adjustment device 210 can be provided to adjust a vertical position of upper tool assembly 132 with respect to tool assembly 14. According to several embodiments, an electronic readout device 212 having a digital or analog readout screen 214 can be mounted to die 154 which provides visual output data on multiple criteria, including but not limited to quantity and type of electrical terminals 190, terminal feed rate, press operating conditions, and the like. Electronic readout device 212 can also be connected to and receive output data from sensor 194. In these embodiments, an electrical lead (not shown) connecting sensor 194 to electronic readout device 212 is first disconnected to remove feed guide and tool support assembly 10 from die 154. For several embodiments, male dovetail member 160 is shown which as previously noted is used to align feed guide and tool support assembly 10 on die platen 156.

Figure 14:
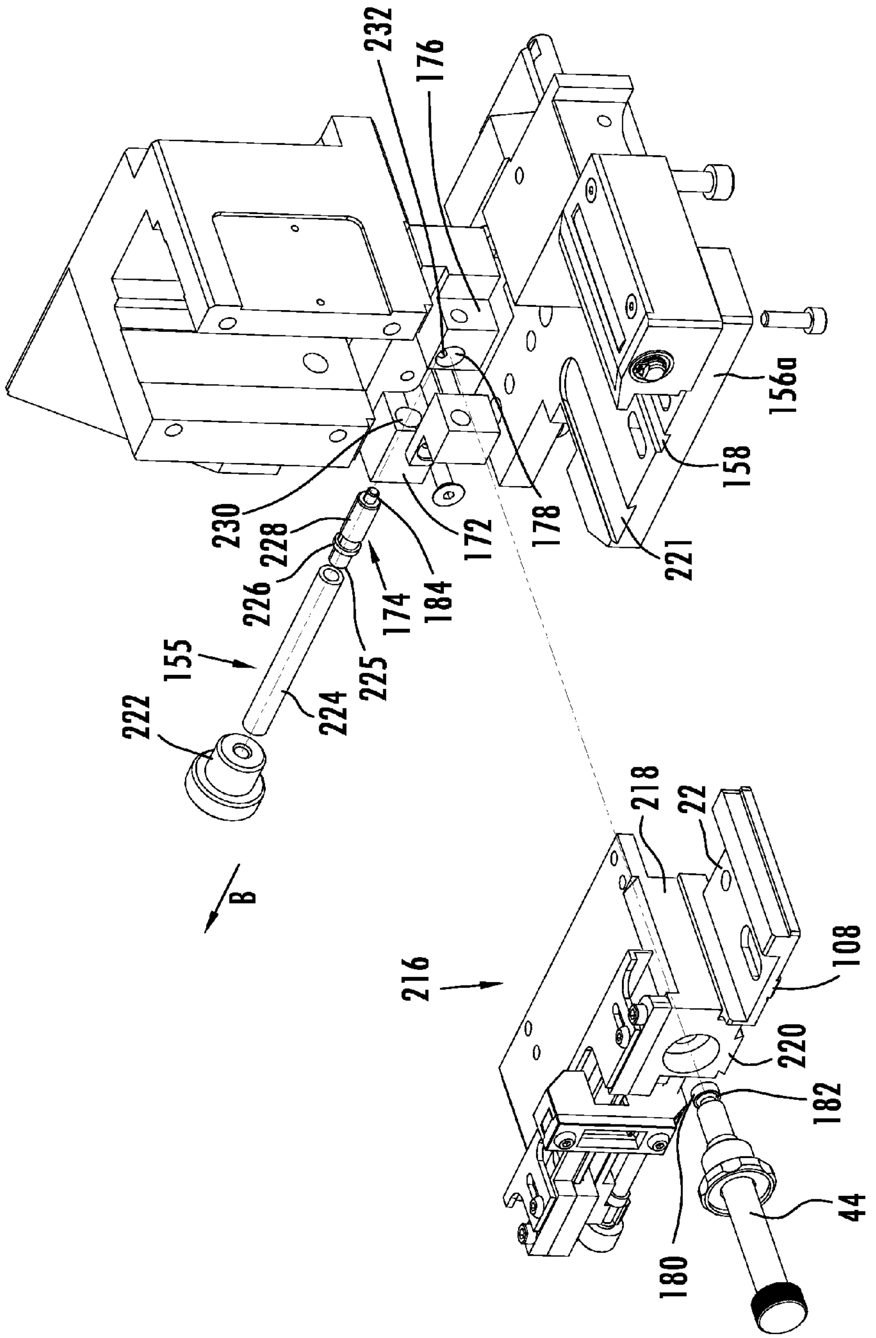
FIG. 14 is a left front perspective assembly view of another embodiment of a feed guide and tool support assembly and die.

Referring to FIG. 14, according to other embodiments, a feed guide and tool support assembly 216 is modified from feed guide and tool support assembly 10 to include an adjustment device receiving portion 218 having a male dovetail pin 220 extending therefrom, which is slidably mated with a female dovetail slot 221 in a modified die platen 156*a*. This embodiment continues use of male key member 108 which is slidably received in female slot 158 of die platen 156*a*. The terminal head 180 and reduced diameter portion 182 features of adjustment device 44 are also more clearly depicted in FIG. 14.

With further reference to FIG. 14 and again to FIG. 10, single fastener 155 can be assembled from multiple component parts, such as a grip knob 222 and a tubular body 224. Threaded body portion 174 can include a male tubular portion 225 inserted into tubular body 224, a flange 226, and a threaded portion 228 having tapered male extending pin 184 axially extending therefrom. Threaded portion 228 mates with a female threaded aperture 230 of first apertured block 172. Tapered male extending pin 184 slidably extends through and beyond a pin receiving bore 232 of second apertured block 176. Pin receiving bore 232 is oriented substantially transverse to alignment aperture 178 of second apertured block 176. When grip knob 222 is pulled in the pin release direction "B", male extending pin 184 is retracted from reduced diameter portion 182 of adjustment device 44 to permit removal of feed guide and tool support assembly 216 (and similarly to remove feed guide and tool support assembly 10).

Figure 15:
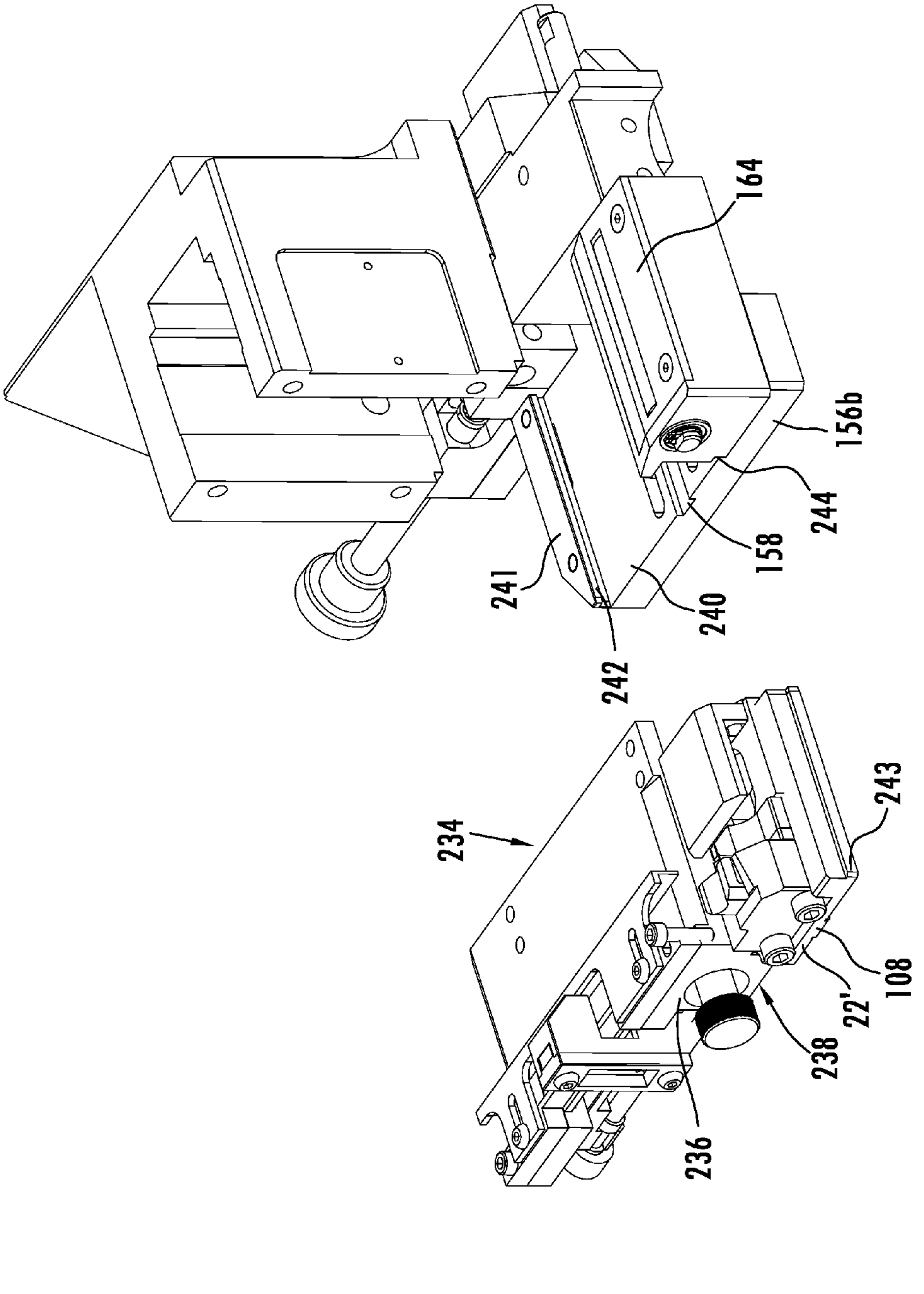
FIG. 15 is a front perspective assembly view of another embodiment of a feed guide and tool support assembly and die.

Referring to FIG. 15, according to further embodiments, a feed guide and tool support assembly 234 is modified from feed guide and tool support assembly 10 to provide an adjustment device receiving portion 236 having a substantially flat engagement portion 238 slidably engaged on a flat receiving portion 240 of a modified die platen **156*b*. An alignment member 241 can be fastenably connected to die platen 156*b*. Alignment member 241 includes a male extending flange 242 facing female slot 158. A male tongue 243 extending from tool receiving portion 22' is slidably received in a female groove 244 created in a body portion of off-load alignment member 164 to provide vertical retention of feed guide and tool support assembly 234 on flat receiving portion of modified die platen 156*b***.

Figure 16:
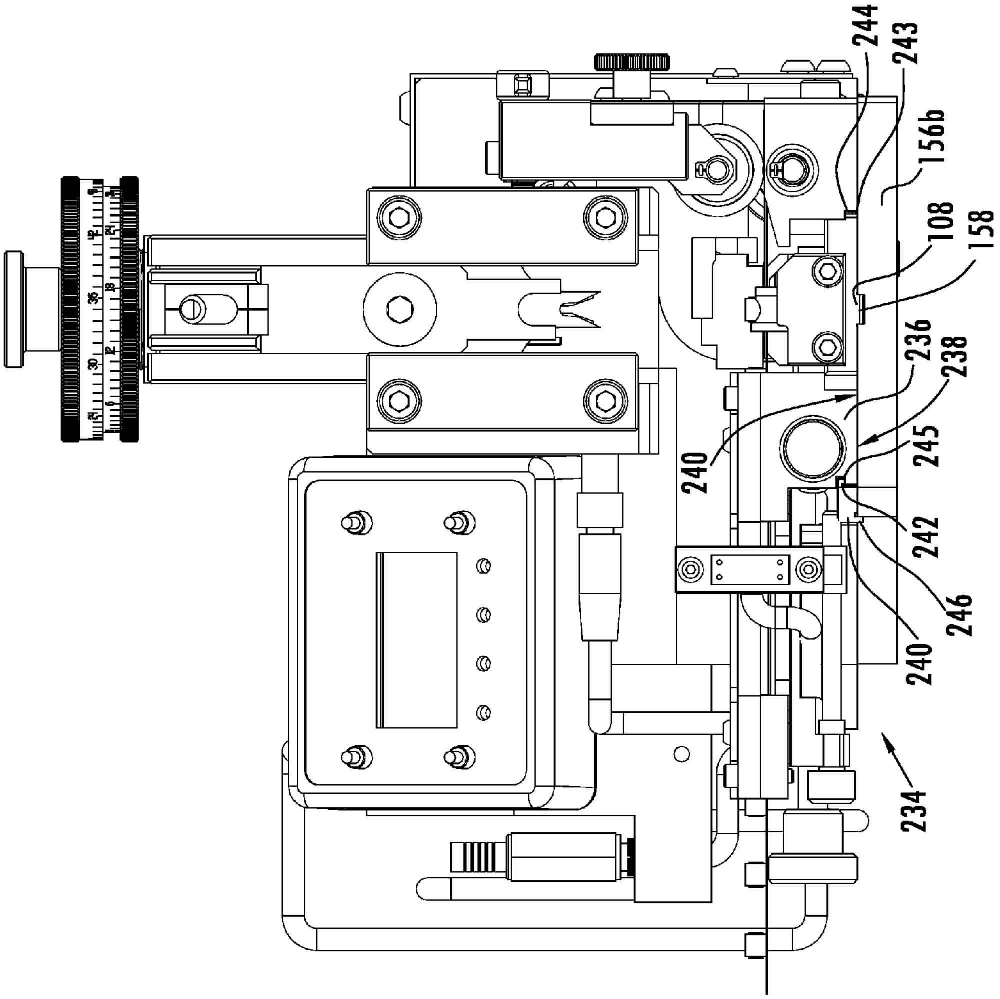
FIG. 16 is a front elevational view of an assembled feed guide and tool support assembly and die of FIG. 15.

Referring to FIG. 16, feed guide and tool support assembly 234 is shown mounted to die platen **156*b* having male extending flange 242 slidably received in a longitudinal slot 245 created in adjustment device receiving portion 236 and male key member 108 slidably received in female slot 158. Engagement portion 238 is in sliding contact with receiving portion 240. To further engage receiving portion 240 with die platen 156*b*, a male key 246 extending from receiving portion 240 is slidably inserted in a slot created in die platen 156*b***.

Figure 17:
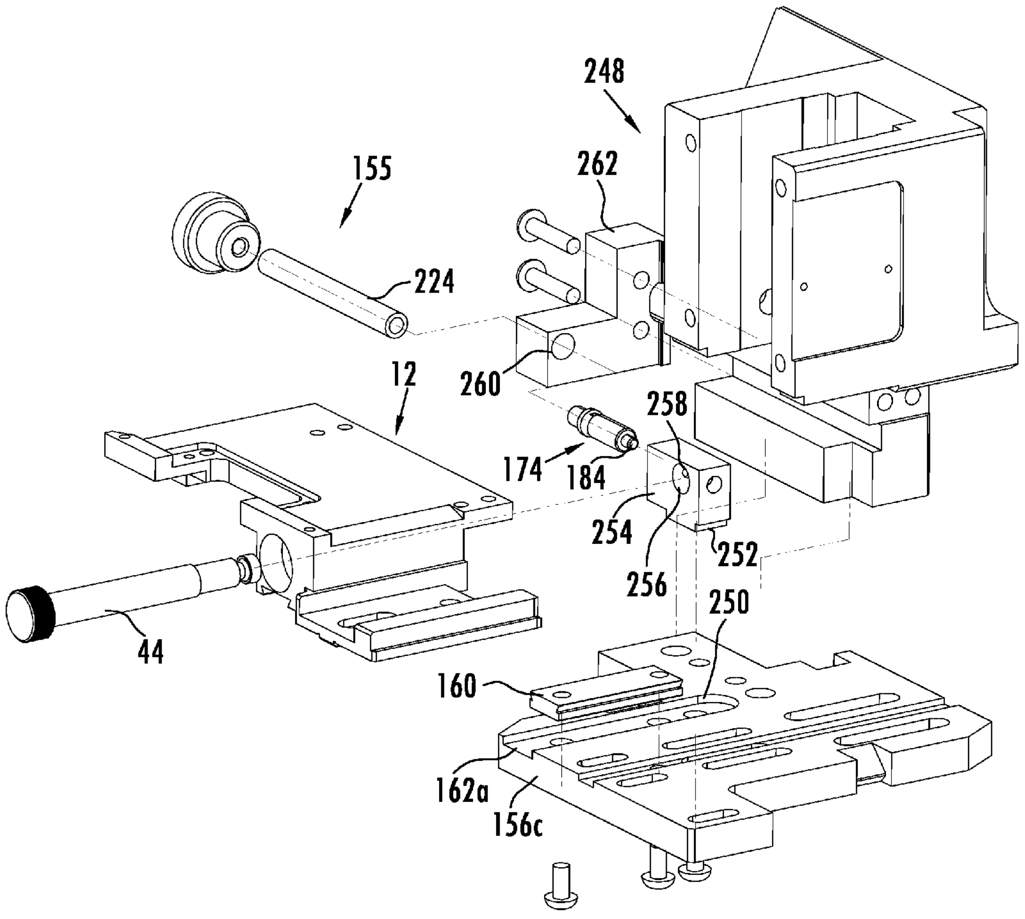
FIG. 17 is a left front perspective view of another embodiment of a feed guide and tool support assembly and die.

Referring to FIG. 17, a ram alignment member 248 is connected to a further modified die platen **156*c* having a modified female slot 162*a* lengthened at a slot end 250. A key member 252 of a third apertured block 254 is slidably received in modified female slot 162*a* at slot end 250. Third apertured block 254 is then fastened to modified die platen 156*c*. Adjustment device 44 is slidably received in an aperture 256 of third apertured block 254. The tapered male extending pin 184 extending from threaded body portion 174 is slidably received through a pin aperture 258 to engage adjustment device 44 as previously described herein in reference to FIG. 10. The threaded portion 228 of single fastener 155 is threadably received in a female threaded aperture 260 of a fourth apertured block 262 which is fastened to ram alignment member 248. The use of third and fourth apertured blocks 254, 262 provides increased flexibility in locating and adjusting the position of one-piece member 12**.

Referring to FIG. 18 and again to FIGS. 10 and 14, the threaded body portion 174 is shown having male extending pin 184 in its normally biased extended position, partially extending outwardly from threaded portion 228. A biasing member 264 such as a tension spring normally biases male tubular portion 225, flange 226 and male extending pin 184 in the first direction "A". In the normally biased extended position of male extending pin 184, a rectangular shaped member 266 connected to flange 226 is partially received in a slot 268 created in an unthreaded sleeve portion 270 which is connected to threaded portion 228. In the normally biased extended position, male extending pin 184 is received in reduced diameter portion 182 of adjustment device 44, which engages feed guide and tool support assembly 10 to die platen 156 of die 154.

Figure 18:
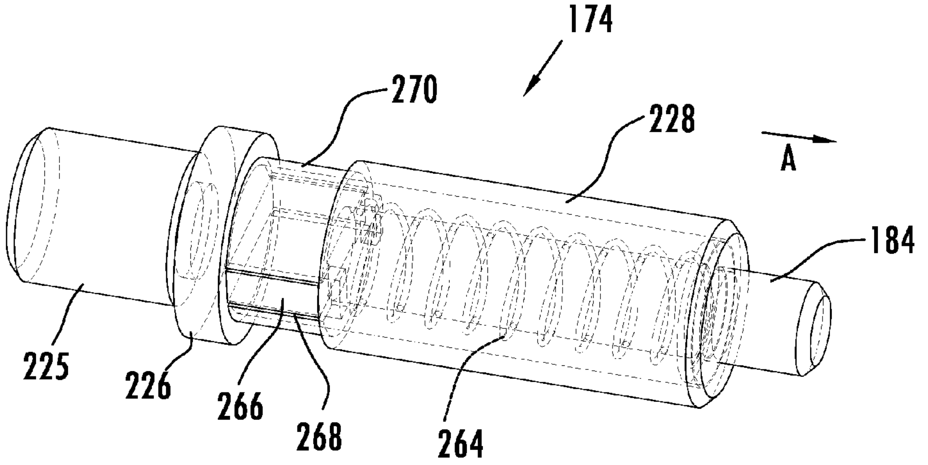
FIG. 18 is a front perspective view of a spring biased tapered pin assembly of the present disclosure with the tapered pin in its normally outward biased extended position.

Referring to FIG. 19 and again to FIGS. 10, 14 and 18, single fastener 155 can be a spring biased quick release sliding pin. To release male extending pin 184 from reduced diameter portion 182 of adjustment device 44, and therefore permit removal of feed guide and tool support assembly 10 from die 154, single fastener 155 is pulled in the release direction "B" which moves male tubular portion 225, flange 226 and male extending pin 184 in the release direction "B" relative to threaded portion 228 until male extending pin 184 is retracted through a pin positioning aperture 272 into an inner cavity 278 of threaded portion 228. A tension force is thereby created in biasing member 264. When rectangular shaped member 266 is clear of slot 268, tubular portion 225 can be axially rotated (for example approximately 90 degrees) from the position shown so that an end face 274 of rectangular shaped member 266 will be biased into contact with a corresponding and oppositely directed second end face 276 of unthreaded sleeve portion 270 to hold male extending pin 184 within the inner cavity 278 of threaded portion 228. Feed guide and tool support assembly 10 can thereafter be removed from die 154.

Figure 19:
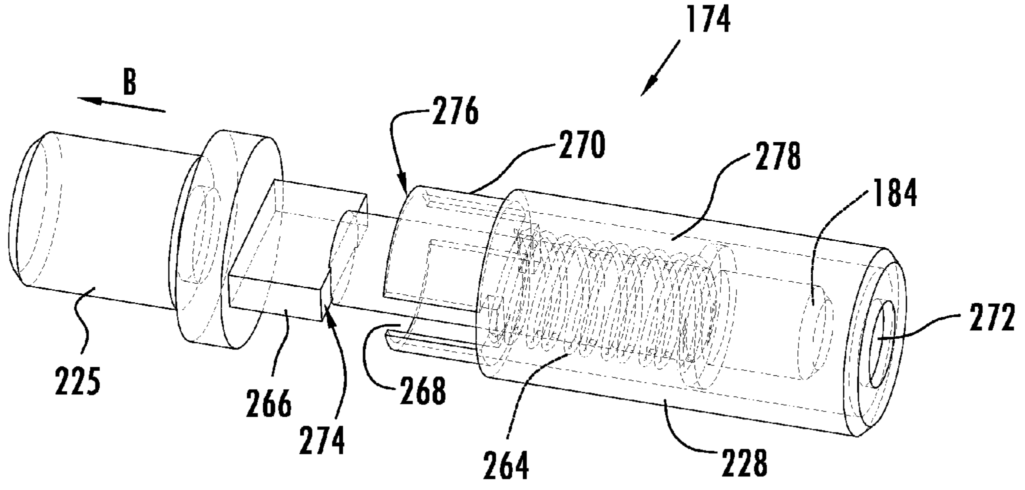
FIG. 19 is a front perspective view of the spring biased tapered pin assembly of FIG. 18 showing the tapered pin in a retracted position.

After a replacement feed guide and tool support assembly 10 is mounted on die platen 156 of die 154, (or one of the other embodiments discussed herein) single fastener 155 including tubular portion 225 can be axially rotated (for example approximately 90 degrees) to realign rectangular shaped member 266 with slot 268 as shown in FIG. 19. The biasing force of biasing member 264 will bias male extending pin 184 in the first direction "A" such that male extending pin 184 is axially extended as shown in FIG. 18 to again engage adjustment device 44 of the replacement feed guide and tool support assembly 10.

Figure 21:
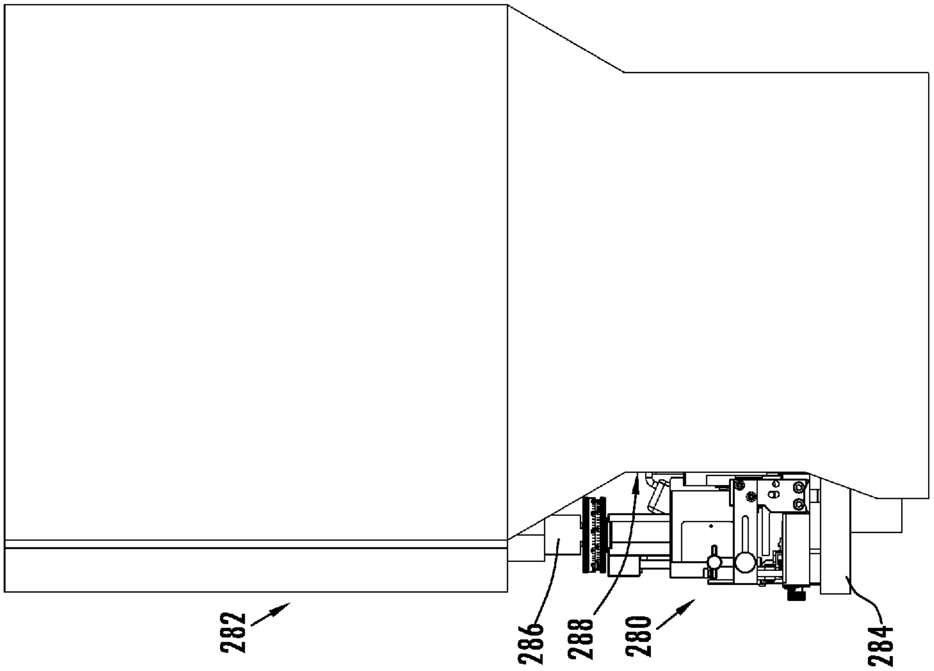
FIG. 21 is a side elevational view of the press of FIG. 20.
Figure 20:
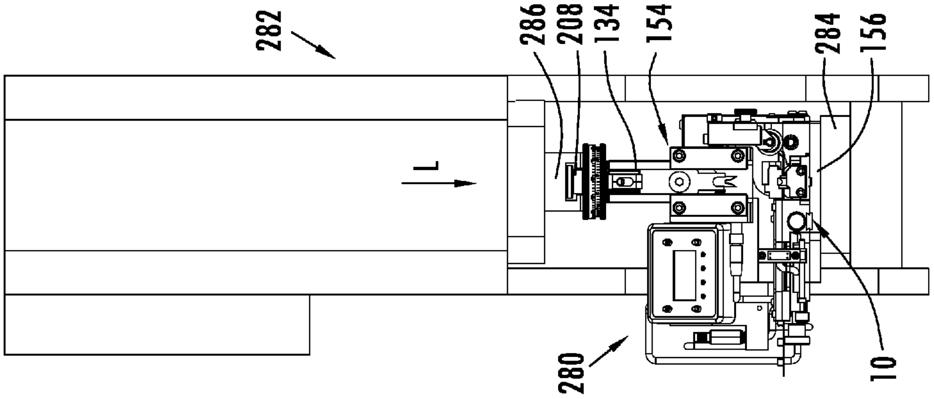
FIG. 20 is a front elevational view of an exemplary press having the tool assembly of the present disclosure.

Referring to FIGS. 20 and 21, a tool and die assembly 280 having feed guide and tool support assembly 10 connected to die 154 is shown mounted to a press 282. Die platen 156 is releasably fastened to a platen support plate 284 of press 282. A ram connecting member 286 is connected to force transfer member 208 to transfer the downward force of press 282 in the downward driving direction "L" to ram 134. A recessed frame wall 288 of press 282 can provide access to components and fasteners of tool and die assembly 280.

According to several embodiments, assembly of the feed guide and tool support assembly 10 can further include ram 134 connected to the die 154, and at least one punch 146,148 connected to the ram 134 and aligned with the at least one conductor anvil 54. The tool assembly 14 can include a insulation anvil 60 releasably fastened to the tool mount block 46, and a terminal straightener 70 adjustably positioned with respect to the conductor anvil 54 and releasably secured to the tool mount block 46. The plate portion 157 of the die 154 can have one of a male member (male dovetail member 160) extending therefrom or a female slot (female slot 162) created therein. The other one of the male members (as male dovetail pin 220) or the female slot (as female slot 102) is created in the one-piece member 12 such that the one-piece member 12 is slidably connected with the male member by a sliding fit between the male member and the female slot.

According to other embodiments, the male member (as male key member 108) is a dovetail shaped member created on the stock guide portion 20 and the female slot (as female slot 158) has a corresponding dovetail shape to receive the male dovetail shaped member. A male key member 108 can also be extended from the tool receiving portion 22 and slidably received in a key slot (modified from female slot 158 to a longitudinal slot) created in the plate portion 157 to further align the one-piece member 12 to the die 154. The stock guide portion 20 can further include homogeneously extending guide rail 30 to align terminal holder strip 188 holding multiple individual electrical terminals 190 with tool assembly 14 fastened to the tool receiving portion 22.

The feed guide and tool support assembly 10 can further include an axially rotatable adjustment device 44 threadably connected to the one-piece member 12 and connected to the die by the single fastener 155 to adjust a horizontal position of the one-piece member 12 by rotation of the rotatable adjustment device 44. The one-piece member 12 can be made as a homogeneous member, a non-releasable assembly of components, or directly connected components created for example as a casting of a metal material such as aluminum, steel, magnesium, or an alloy of materials, machined from a block or billet of material, or molded such as by casting or injection molding using a polymeric or composite material, with the stock guide portion 20 displaced or elevated with respect to the tool receiving portion 22 such that a terminal 190 slidably fed on the stock guide portion 20 aligns with a tool assembly 14 mounted on the tool receiving portion 22.

A sensor 194 such as but not limited to an optical sensor, a mechanical sensor, a light/beam sensor, an air sensor, or the like which identifies a part location can be connected to the stock guide portion 20 to provide indication of the passage of a next terminal 190' moving toward the tool receiving portion 22. The optical sensor 194 can also be removable together with one-piece member 12 when the single fastener 155 is released.

Referring to FIG. 22 and again to FIG. 1, a feed guide and tool support assembly 300 is similar to feed guide and tool support assembly 10, therefore only the differences will be further discussed herein. Feed guide and tool support assembly 300 includes a one-piece member 312 which can have a releasably connected tool assembly 314 which is similar to tool assembly 14, an adaptor portion 316 similar to adapter portion 16, and a releasable rail portion 318 similar to releasable rail portion 18. One-piece member 312 includes a stock guide portion 320 modified from stock guide portion 20 and which has a tool receiving portion 322 fixedly connected to the stock guide portion 320 such as by fastening, non-releasable connection, or being together created as a homogeneous member. The stock guide portion 320 includes a plate or stock guide platen 324 which defines a substantially planar surface. A platen opening 326 is created in stock guide platen 324 to permit access to adaptor portion 316. A cover plate 328 similar to cover plate 28 can be fastenably connected to stock guide portion 320 to cover platen opening 326. A guide rail 330 can be fixed directly to, or is homogeneously or non-releasably connected to and extends upwardly from stock guide platen 324.

Stock guide portion 320 is modified from stock guide portion 20 to further include a through bore 322 which is oriented parallel to clearance aperture 100' which receives adjustment device 44'. A first drive shaft 334 is positioned in through bore 322. First drive shaft 332 has a flat portion 336 extending for its total length which is engaged by a flat inner face 338 of a "D" shaped bore created in a sleeve 340. Sleeve 340 can include a knurled surface 341 or a similarly rough surface to positively engage a terminal holder strip shown and described in reference to FIG. 27. First drive shaft 334 further extends through a first bearing assembly 342. A diameter of sleeve 340 is adapted to be slidably received in through bore 332. A first portion 344 of first bearing assembly is also slidably received in through bore 332, and a second portion 346 having a diameter greater than the diameter of through bore 332 abuts against an outer front face 348 of stock guide portion 320. The first bearing assembly 342 and the sleeve 340 are retained on first drive shaft 334 by a first snap ring 350 coupled in a ring groove 352 of first drive shaft 334. Rotation of first drive shaft 334 provides for a "push" feed of a carrier strip such as carrier strip 192 shown and described in reference to FIG. 12. The push feed operation will be better described in reference to FIGS. 27-29.

At an opposite end of first drive shaft 334 with respect to first bearing assembly 350, a second bearing assembly 354 rotatably supports the first drive shaft 334 in the through bore 332. The second bearing assembly 342 is retained on first drive shaft 334 by a second snap ring 356 coupled in a ring groove (not visible in this view) similar to ring groove 352. A drive pin 358 is received at a free end of first drive shaft 334 which will be described in greater detail in reference to FIGS. 32-34. The tool assembly 314 when mounted on the tool receiving portion 322 is located "downstream" of the stock guide portion 320 as related to the feed direction of a terminal strip described in greater detail in reference to FIGS. 27-29.

Figure 22:
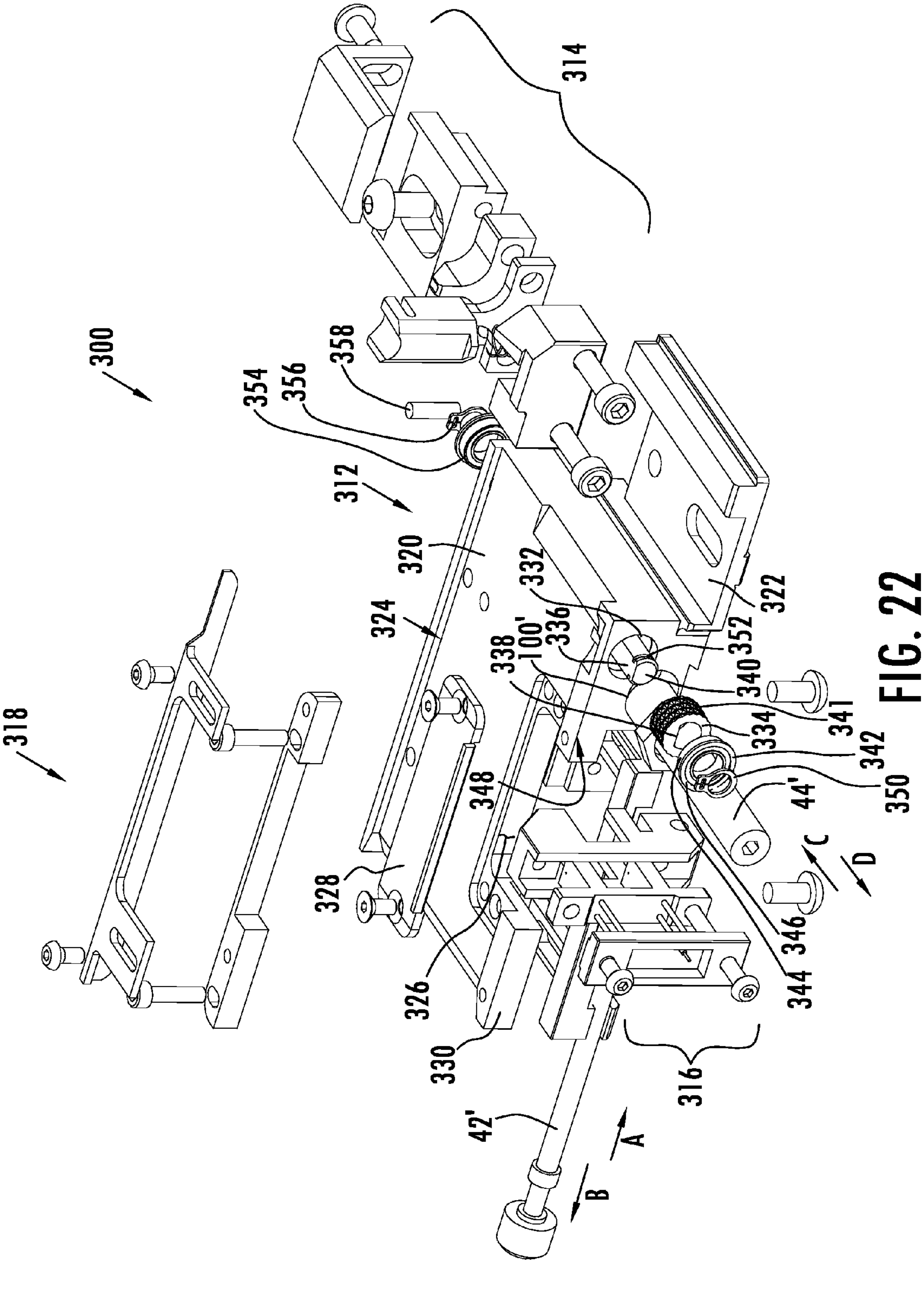
FIG. 22 is a front left perspective assembly view of a one-piece member of a push feed guide and tool support assembly of the present disclosure.

Referring to FIG. 23 and again to FIG. 22, a semi-circular notch 360 is formed such as by machining into an upper face 362 of the second guide rail portion **30*b*' and substantially center-aligned with a longitudinal axis of through bore 332. A depth of the semi-circular notch 360 also extends through the thickness of the planar surface 86' of stock guide platen 324 such that a rectangular shaped aperture 364*a* is opened through planar surface 86' opening into through bore 332. According to other embodiments a rectangular shaped aperture 364*b* is used in place of aperture 364*a* and is positioned further inward on the planar surface of stock guide platen 324. Aperture 364*b* is longer that aperture 364*a* to accommodate a longer engagement area for a polymeric terminal strip described in further reference to FIG. 27**.

Figure 23:
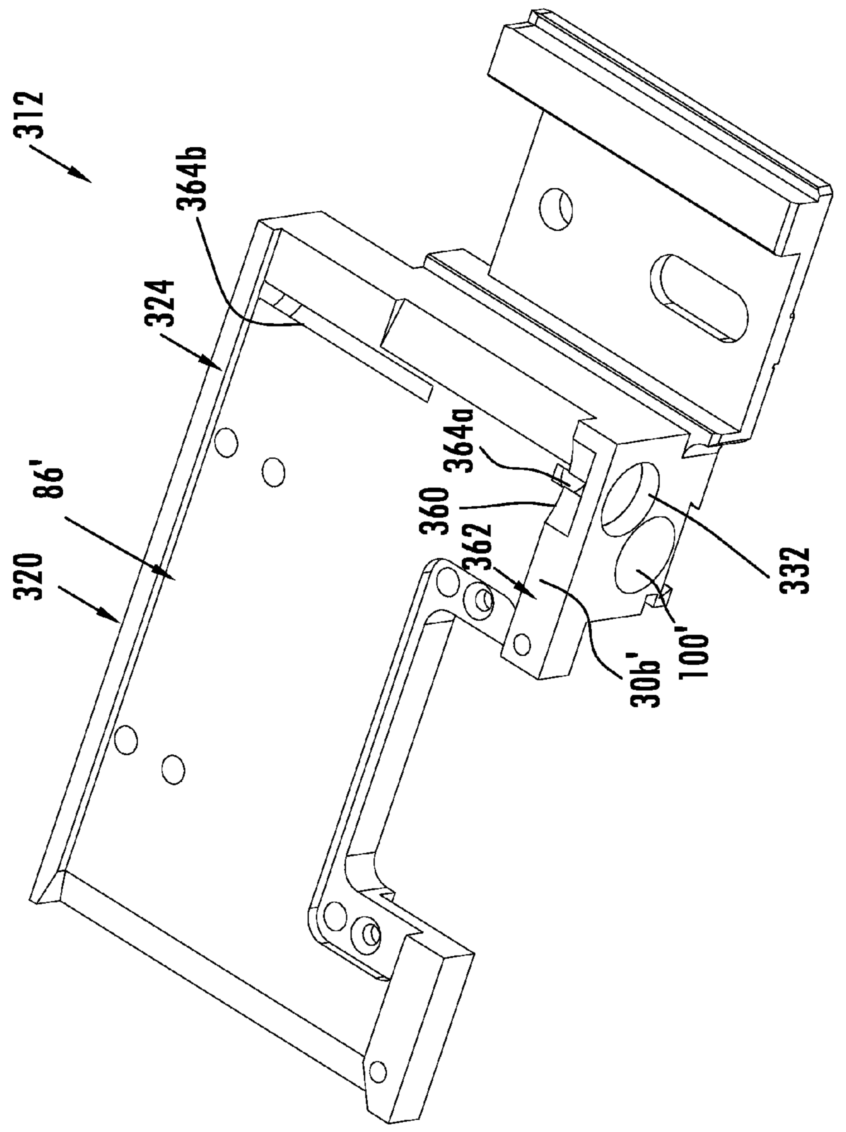
FIG. 23 is a top left perspective view of the one-piece member of FIG. 22.

Referring to FIG. 24 and again to FIG. 23, the rectangular shaped aperture 364 extends for only a partial length of through bore 332. The rectangular shaped aperture 364 is also oriented substantially parallel to the longitudinal axis of clearance aperture 100'.

Figure 24:
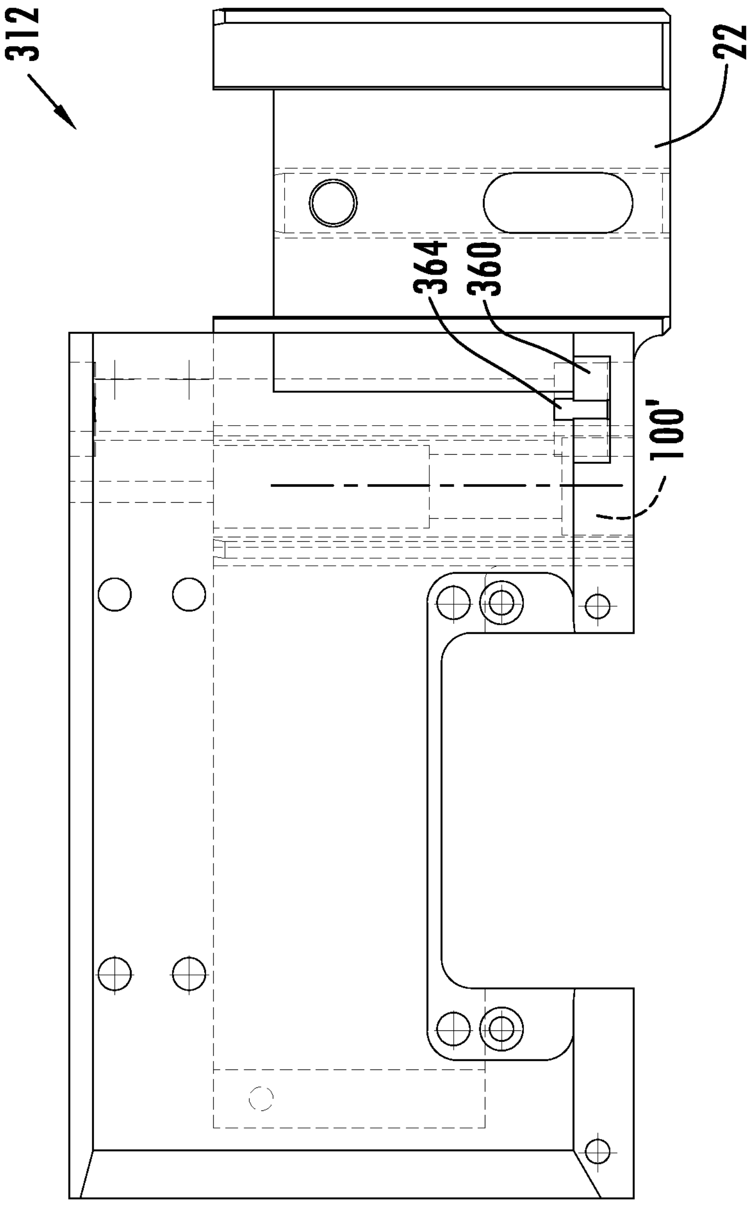
FIG. 24 is a top plan view of the one-piece member of FIG. 22.

Referring to FIG. 25 and again to FIGS. 22-24, according to several embodiments, the feed guide and tool support assembly 300 is completed by addition of tool assembly 314 releasably secured to the tool receiving portion 322. The feed guide and tool support assembly 300 can then be releasably disconnected to a die 366 for operation by a press (shown and described in reference to FIGS. 20, 21), forming an electrical terminal applicator system 368. The single fastener 155' can also be used to releasably connect the one-piece member 312 to the die 366.

Figure 25:
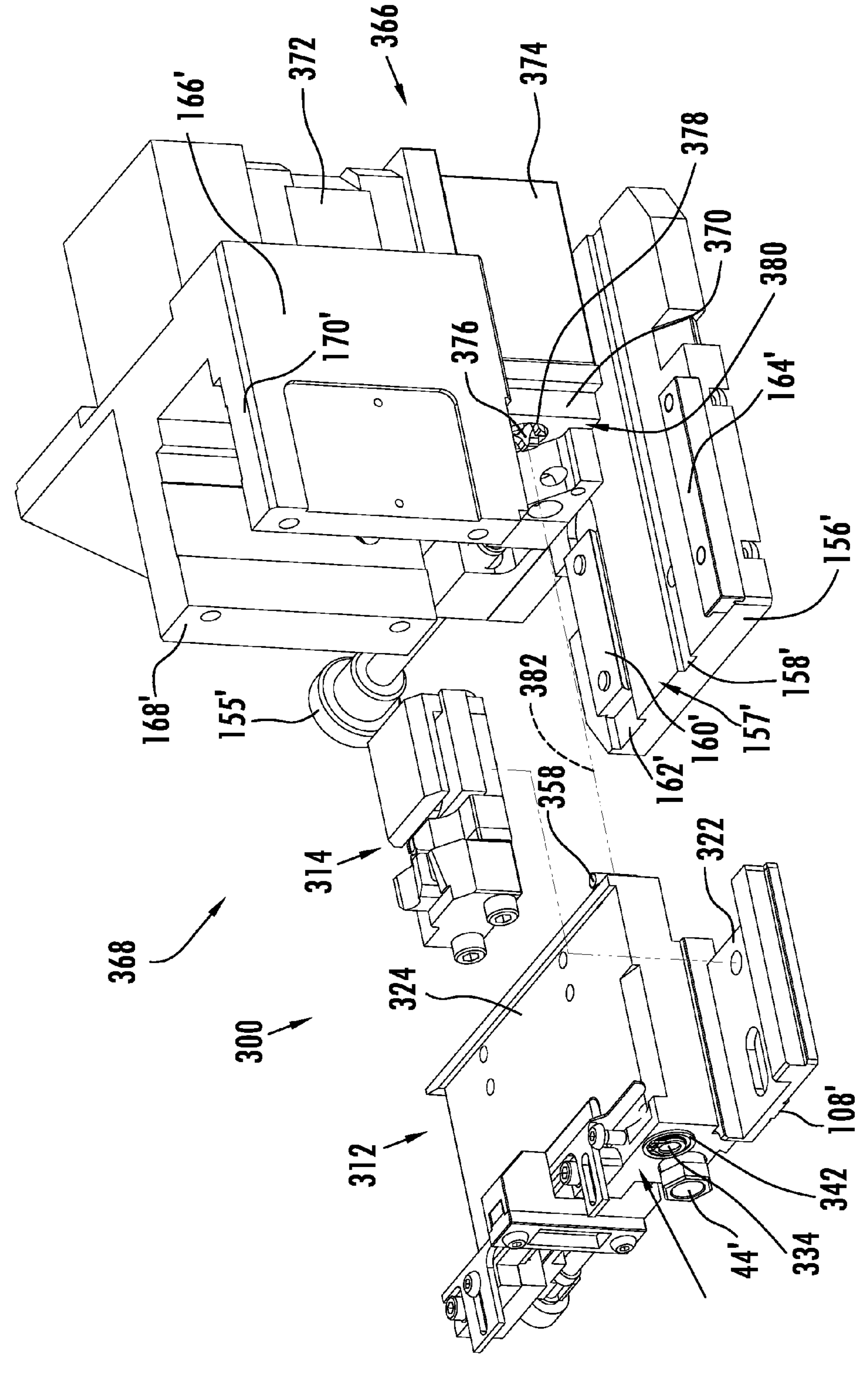
FIG. 25 is a left front perspective view of a push feed guide and tool support assembly with the one-piece member of FIG. 22 in position to be received by a die.

FIG. 25 further shows die 366 can include die platen 156' having plate portion 157' of the die 366 including female slot 158' which slidably receives male key member 108' of tool receiving portion 322. The rectangular shaped portion of male dovetail member 160' is slidably received in the female slot 162' created in die platen 156' and fastenably connected to die platen 156' to fix its position. The off-load alignment member 164' horizontally aligned with stock guide platen 324 provides horizontal support for completed wire/terminal components exiting feed guide and tool support assembly 300. The ram alignment member 166' slidably receives ram 134 (shown in FIG. 7) between opposed first and second alignment walls 168', 170'.

With continued reference to FIG. 25, the alignment member 162 includes a support wall 370 to which is mounted an electric motor 372 such as a stepper motor. A transmission 374 is connected to the output drive of electric motor 372. Transmission 374 converts the rotational drive force created by electric motor 372 to rotate a coupler member 376 which is rotatably received in a bore 378 created in support wall 370 and which partially extends outwardly from a forward facing surface 380 of support wall 370. When feed guide and tool support assembly 300 is connected to die 366, the drive pin 358 is coupled to coupler member 376 which rotates with respect to a common longitudinal axis 382 of first drive shaft 334 such that rotation of coupler member 376 co-rotates first drive shaft 334.

Figure 26:
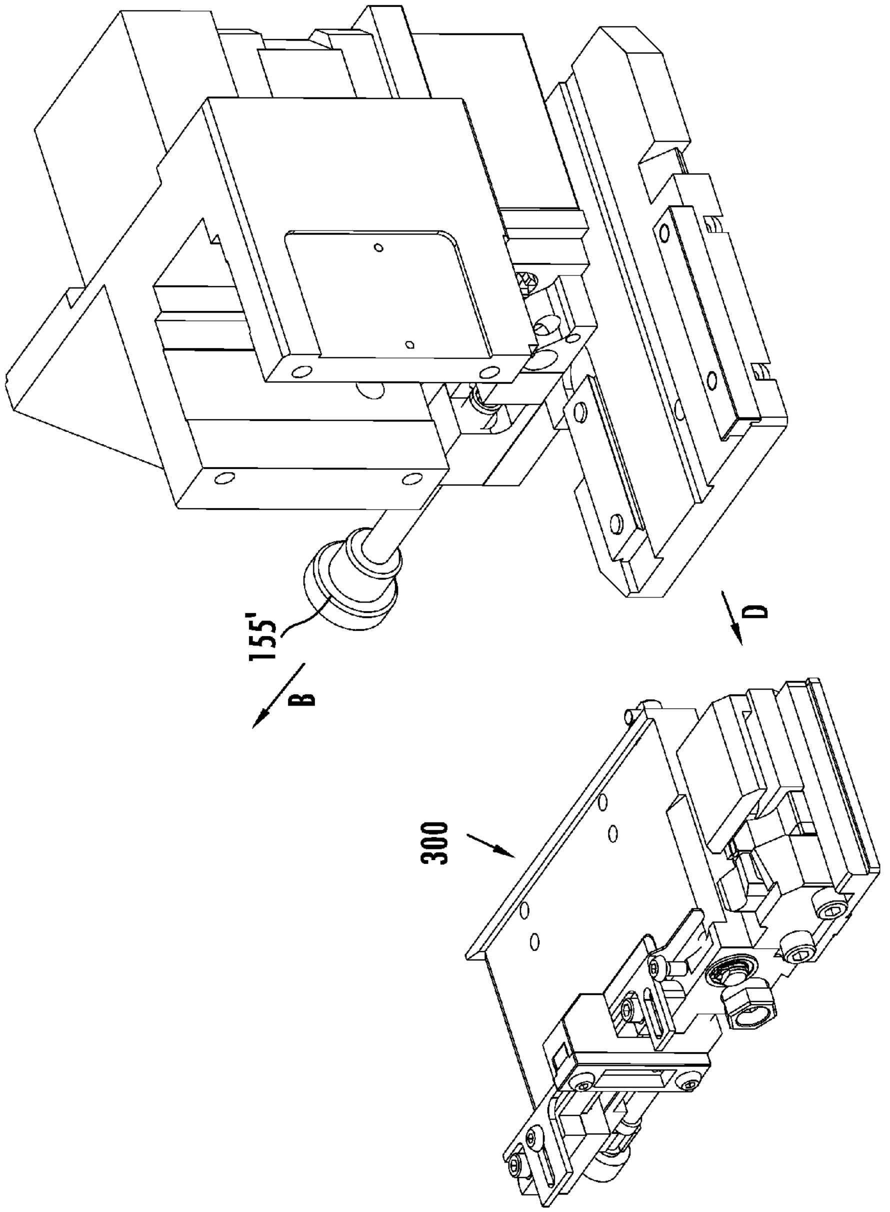
FIG. 26 is a left front perspective view of the push feed guide and tool support assembly with the one-piece member of FIG. 25 after removal from the die.

Referring to FIG. 26 and again to FIG. 25, when the single fastener 155' is released in the second direction "B" the one-piece member 312 can be disconnected from the die 366. One-piece member 312 is removed in the outward horizontal direction "D".

Referring to FIG. 27 and again to FIGS. 22-26, each feed guide and tool support assembly 300 when releasably connected to die platen 156' of die 366 can receive at least one size of a terminal holder strip 384. Terminal holder strip 384 includes electrical terminals 386 connected to a carrier strip 388. Terminal holder strip 384 is fed in the terminal feed direction "K". Each electrical terminal 386 can be identified as it passes sensor 194', such as an optical sensor, mounted to adaptor portion 316, to initiate action of ram 134'. Prior to initiation of a next ram cycle, the wire strip 196' having insulation portion 198' and stripped wire portion 200' is inserted into a next electrical terminal 386'. Each ram cycle (a downward and an opposite upward motion of ram 134') engages wire strip 196' to the next electrical terminal 386' and separates an assembly of the wire strip 196' and the next electrical terminal 386' from a carrier strip portion 390 having no electrical terminals 386.

Feed guide and tool support assembly 300 is modified from feed guide and tool support assembly 10 to provide for a "push" feed of the terminal holder strip 384 and carrier strip 388 in lieu of the "pull" feed used by feed guide and tool support assembly 10. The push feed is accomplished by rotating first drive shaft 334 to provide positive displacement of carrier strip 388 in the terminal feed direction "K". First drive shaft 334 is positioned "upstream" of the tool assembly 314 and the upper tool assembly 132', and thereby pushes the terminal holder strip 384 together with the carrier strip 388 "downstream" (toward the viewer in FIG. 27) from the first drive shaft 334 toward each of the tool assembly 314 and the upper tool assembly 132'. The tool assembly 314 when mounted on the tool receiving portion 322 is therefore located "downstream" of the stock guide portion 320 in relation to the terminal feed direction "K".

To maintain positive pressure of the carrier strip 388 against the first drive shaft 334, an idler wheel 392 is positioned partially in the semi-circular notch 360 where the idler wheel 392 contacts the carrier strip 388 and presses the carrier strip 388 into direct contact with the knurled surface 341 of the sleeve 340 engaged to first drive shaft 334 within the aperture 364. The idler wheel 392 spins freely as the carrier strip 388 passes and is rotatably supported by a pin 394 extending through opposed arms of a U-shaped yoke 396. Yoke 396 is rotatable and is downwardly biased by a biasing element such as a spring allowing idler wheel 392 to move upwardly and downwardly as necessary to maintain contact with different thicknesses of carrier strip 388. The carrier strip portion 390 having no electrical terminals 386 is therefore freely displaced downstream of the tool assembly 14' and the upper tool assembly 132'. According to other embodiments, a modified terminal holder strip 384 having only interconnected electrical terminals 386 as the carrier strip 388 can be fed by the feed guide and tool support assembly 300. In these embodiments, the modified holder strip 384 will not produce carrier strip portion 390, and all of the material of the modified holder strip 384 will be used during the crimping and stamping operation, such that no waste portion or carrier strip portion 390 will be produced.

Figure 28:
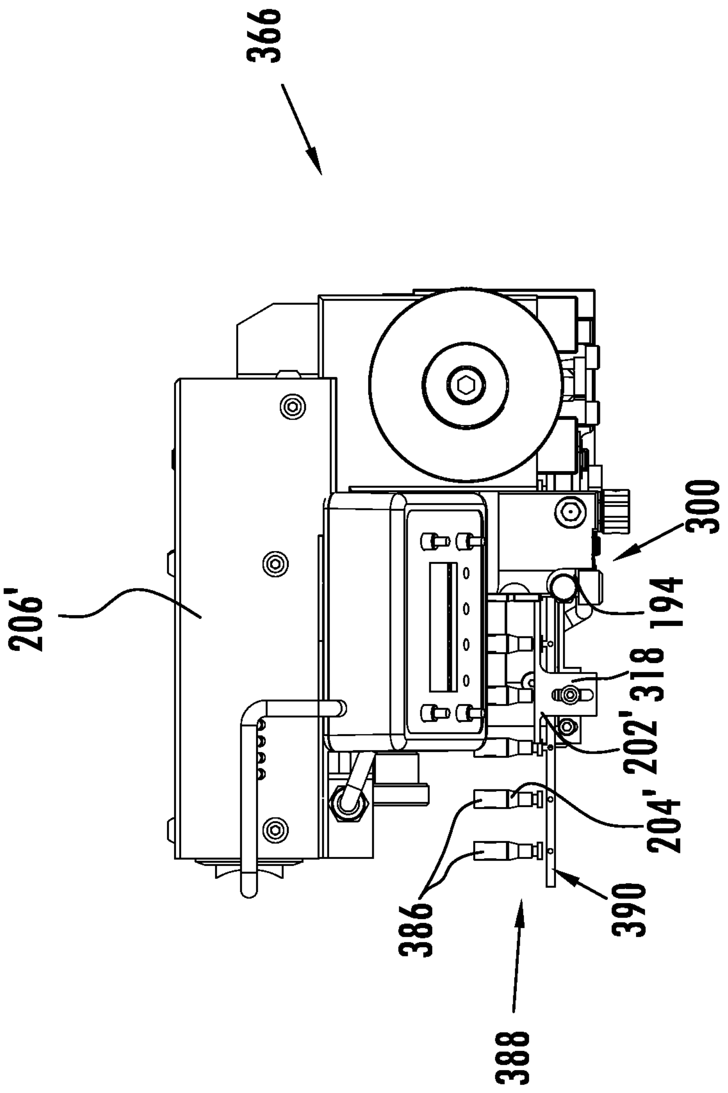
FIG. 28 is a top plan view of the assembly of FIG. 27.
Figure 29:
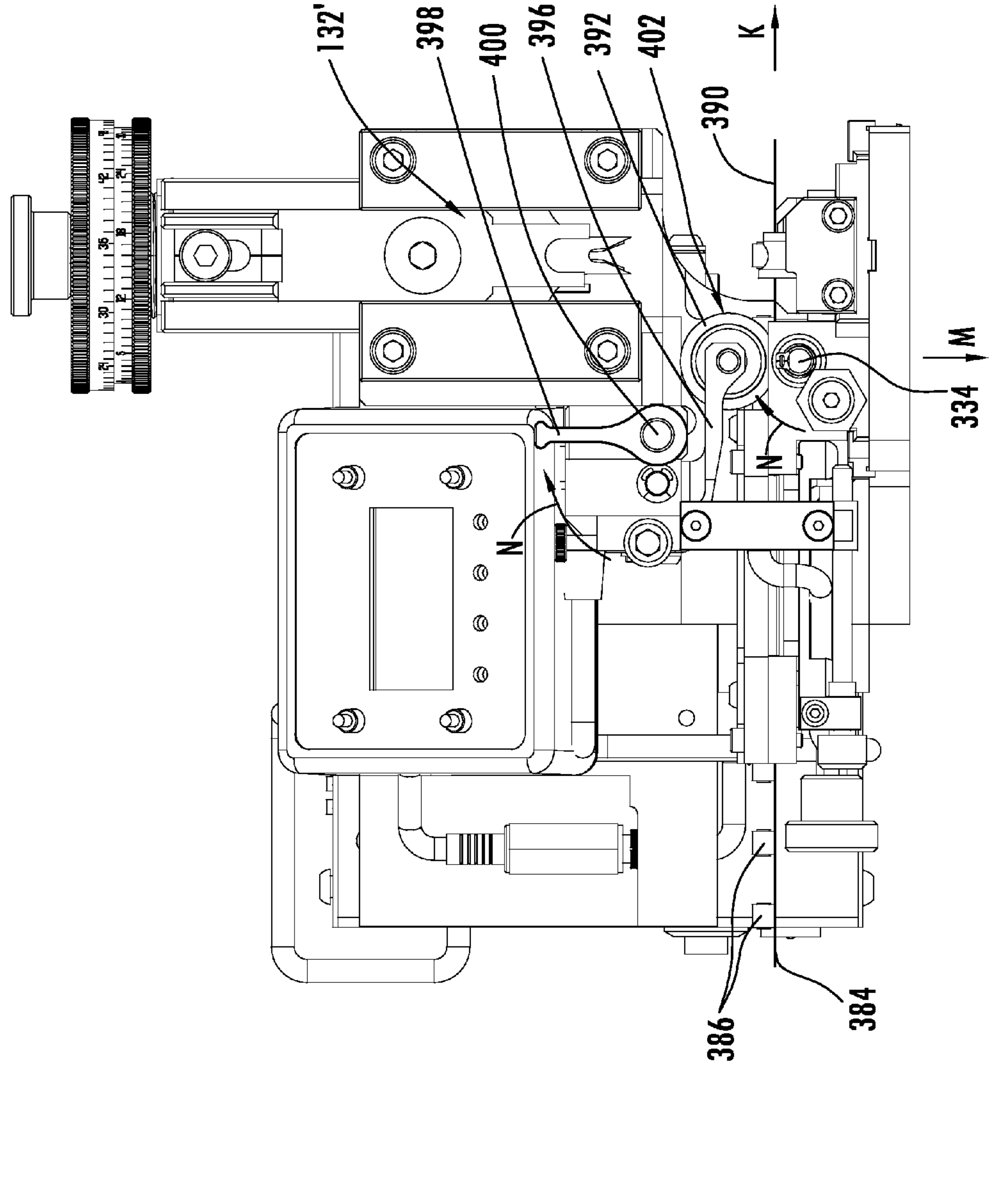
FIG. 29 is a front elevational view of the assembled push feed guide and tool support assembly and die and one-piece member of FIG. 27.

Referring to FIG. 28, each of the electrical terminals 386 can include an alignment recess 204' which aligns with the flange end 202' of rail 78' to guide the plurality of electrical terminals 386. Die 366 can also include an electrical control box 206' which provides electrical control circuitry for electrical programming of die operation.

Referring to FIG. 29 and again to FIG. 28, most of the components used for feed guide and tool support assembly 300 are identical to those of feed guide and tool support assembly 10. For several embodiments, male dovetail member 160' is shown which is used to align feed guide and tool support assembly 300 on die platen 156'. The idler wheel 392 applies a continuous, biased downward pressure on the holder strip 384 in a downward biasing direction "M" as the first drive shaft 334 rotates in a clockwise rotational direction "N". The yoke 396 can be locked in the downward position shown by positioning a cam lever 398 in the vertically upright position shown. Cam lever 398 is coupled to a cam lever shaft 400 and can be moved through approximately 90 degrees of rotation in the clockwise direction of rotation "N" starting from the upright position shown. When cam lever 398 is rotated clockwise away from the locked position shown, a biasing force of a biasing member acting against yolk 396 acts to relieve the downward pressure on yolk 396 allowing idler wheel 392 to rotate upwardly away from contact with the holder strip 384.

Figure 31:
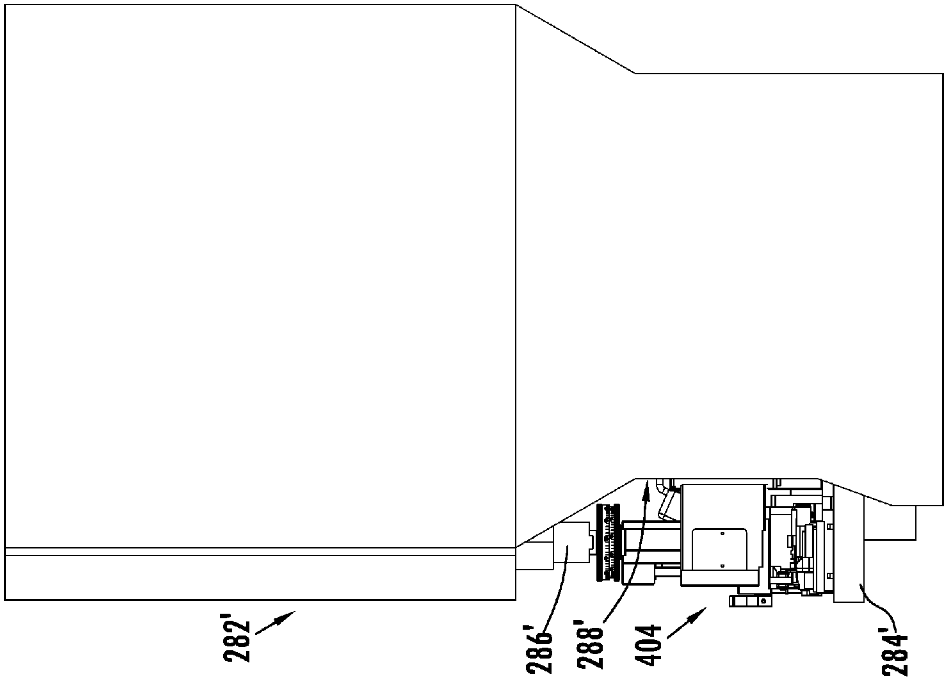
FIG. 31 is an end elevational view of the assembly of FIG. 30.
Figure 30:
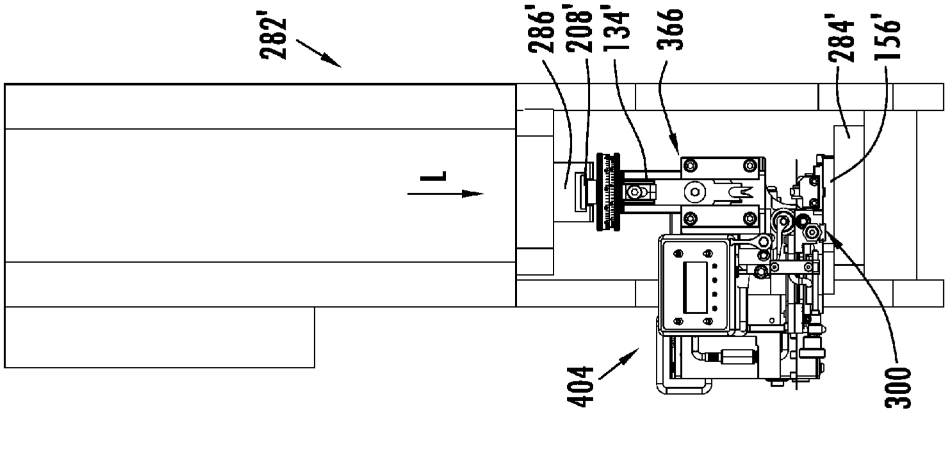
FIG. 30 is a front elevational view of an exemplary press having the assembled push feed guide and tool support assembly of FIG. 29.

Referring to FIGS. 30 and 31, a tool and die assembly 404 having feed guide and tool support assembly 300 connected to die 366 is shown mounted to a press 282'. Die platen 156' is releasably fastened to platen support plate 284' of press 282'. The ram connecting member 286' is connected to force transfer member 208' to transfer the downward force of press 282' in the downward driving direction "L" to ram 134'. The recessed frame wall 288' of press 282' provides access to components and fasteners of tool and die assembly 404.

Figure 32:
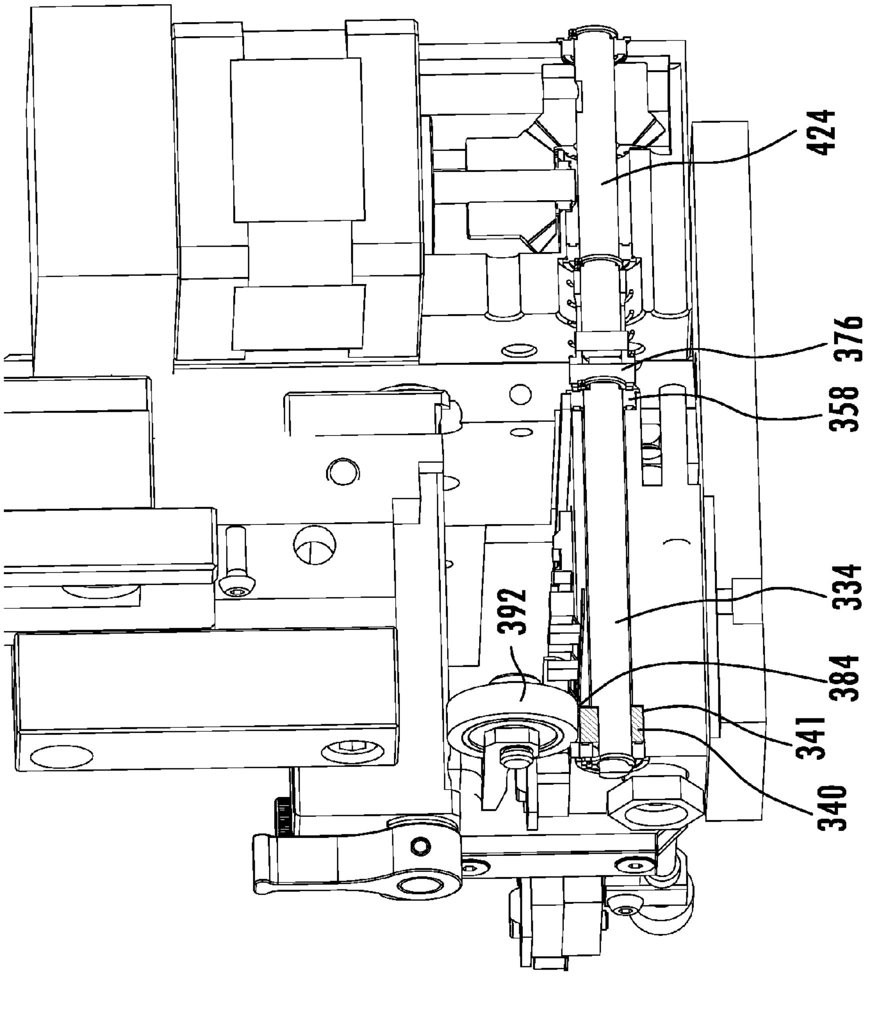
FIG. 32 is a partial cross sectional end elevational view of the push feed guide and tool support assembly and die of FIG. 27.
Figures 33, 34, 35:
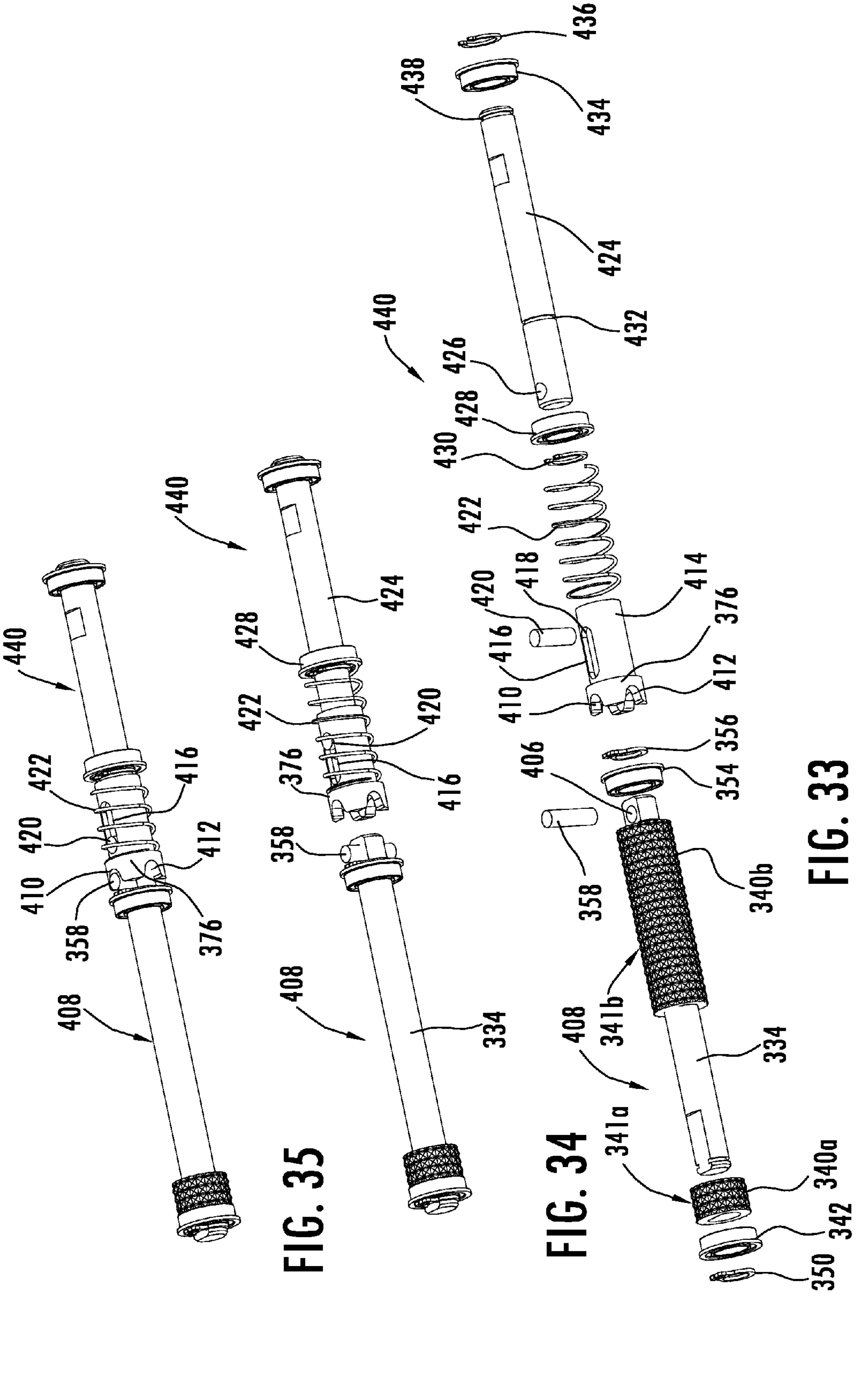
FIG. 33 is an exploded front elevational view of first and second drive shaft assemblies of the present disclosure.
FIG. 34 is a front elevational view of the first and second drive shaft assemblies of FIG. 33 assembled but in a disengaged condition.
FIG. 35 is a front elevational view of the assembled first and second drive shaft assemblies of FIG. 34 further in an engaged condition.

Referring to FIG. 32 the first drive shaft 334 is coupled to a second drive shaft 424 (shown and described in reference to FIGS. 33-35). Second drive shaft 424 provides the motive force to rotate first drive shaft 334 by contact between coupler member 376 and drive pin 358. As the first drive shaft 334 rotates, the sleeve 340 is concomitantly rotated such that the knurled surface 341 contacts and pulls the terminal holder strip 384, which by contact friction counter-rotates the idler wheel 392.

Referring to FIG. 33, the component parts assembled with first drive shaft 334 include sleeve 340, second bearing assembly 342 and first snap ring 350. It is noted sleeve 340 can be provided as a first sleeve **340*a* at first end of first drive shaft 334, or as a second sleeve 340*b* positioned at an opposite second end of first drive shaft 334. Second sleeve 340*b* is longer that first sleeve 340*a* to provide increased surface area for contacting a polymeric material terminal strip. It is also noted first sleeve 340*a* includes a first knurled surface 341*a* and second sleeve 340*b* includes a second knurled surface 341*b*. After the second bearing assembly 354 is installed on first drive shaft 334 and the second snap ring 356 is installed, the drive pin 358 is frictionally installed in an aperture 406 positioned at an opposite end of the first drive shaft 334 with respect to sleeve 340. Aperture 406 is oriented perpendicular to a longitudinal axis of first drive shaft 334. The preceding components together form a first drive shaft assembly 408**.

The drive pin 358 can engage the coupler member 376 within either a first set of curved slots 410 or a second set of curved slots 412 which are oriented 90 degrees from the first set of curved slots 410. The coupler member is integrally connected to an alignment sleeve 414 having an elongated slot 416 created in the alignment sleeve opening into an internal bore 418. An alignment pin 420 is slidably received in the elongated slot 416. A biasing member 422 such as a compression spring is slidably received about a perimeter of the alignment sleeve 414 and abuts at one end to the coupler member 376. A second drive shaft 424 is partially slidably received in the internal bore 418 and provides a pin aperture 426 which frictionally retains the alignment pin 420 such that a portion of the alignment pin 420 extending out of the pin aperture 426 is received in the elongated slot 416, thereby retaining the portion of second drive shaft 424 within internal bore 418 with alignment pin 420 free to displace within the elongated slot 416.

A third bearing assembly 428 is rotatably received on second drive shaft 424 and retained by a third snap ring 430 received in a snap ring slot 432. The second end of the biasing member 422 contacts the third bearing assembly 428. A fourth bearing assembly 434 is rotatably received on second drive shaft 424 at an opposite end with respect to pin aperture 426 and is retained by a fourth snap ring 436 received in a snap ring groove 438. The components mounted on second drive shaft 424 together define a second drive shaft assembly 440.

Referring to FIG. 34 and again to FIG. 33, the fully assembled first and second drive shaft assemblies 408, 440 are shown prior to engagement of the drive pin with coupler member 376. The biasing member 422 is therefore fully extended and the alignment pin 420 is positioned at the end of elongated slot 416 closest to third bearing assembly 428.

Referring to FIG. 35 and again to FIGS. 33 and 34, the fully assembled first and second drive shaft assemblies 408, 440 are shown after engagement of the drive pin 358 with coupler member 376. The biasing member 422 is compressed and the alignment pin 420 is positioned at the end of elongated slot 416 closest to coupler member 376. Rotation of second drive shaft 424 about a longitudinal axis of second drive shaft 424 in the engaged position with therefore co-rotate the first drive shaft 334.

Figure 36:
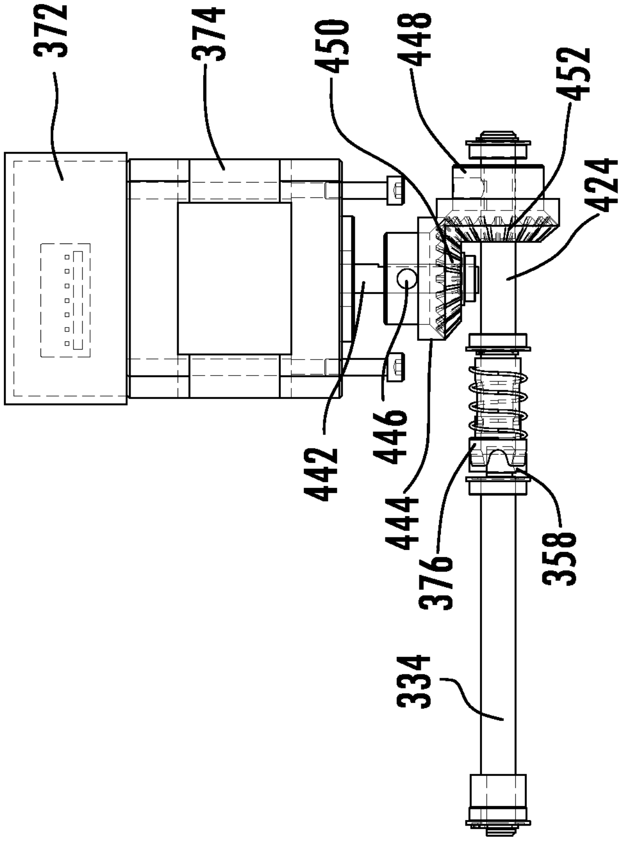
FIG. 36 is an end elevational view of the drive components used to rotate the first and second drive shaft assemblies of FIG. 35.

Referring to FIG. 36 and again to FIGS. 25 and 35, a transmission shaft 442 extends outwardly from the transmission 374 and is rotated by operation of the stepper motor 372. A first bevel gear 444 is fastened onto the transmission shaft 442 by a fastener 446. A second bevel gear 448 is fastened onto the second drive shaft 424. When the transmission shaft 442 rotates, a gear tooth set 450 of the first bevel gear 444 engages a gear tooth set 452 of the second bevel gear 448 to rotate the second drive shaft 424, and by engagement of the coupler member 376 to the drive pin 358, the first drive shaft is also co-rotated. Rotation of the first drive shaft 334 pulls the carrier strip 388 toward the upper tool assembly 132' and the tool assembly 314.

Figure 37:
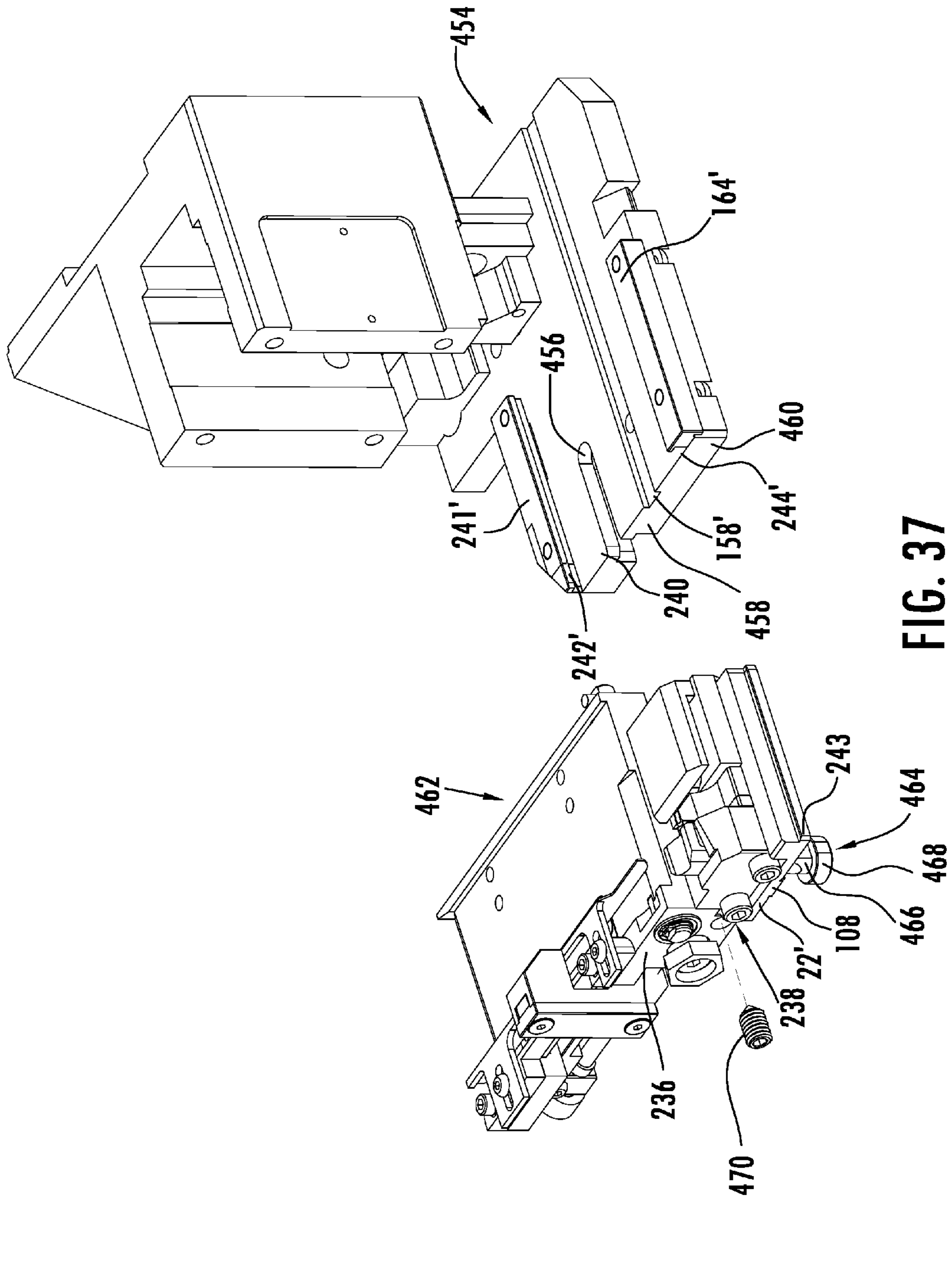
FIG. 37 is a left front perspective view of another embodiment of a push feed guide and tool support assembly modified from FIG. 27.

Referring to FIG. 37, according to further embodiments, the die platen 156 of feed guide and tool support assembly 10 is replaced by a die platen 454 modified from die platen 156 to add an elongated first slot 456 which communicates with an elongated second slot 458 which is wider than first slot 456. Both the first and second slots 456, 458 open at a front face 460 of the die platen 454. The feed guide and tool support assembly 300 is replaced with a feed guide and tool support assembly 462. Feed guide and tool support assembly 462 is similar to feed guide and tool support assembly 300, but the single fastener 155 is eliminated in feed guide and tool support assembly 462 and replaced by a downward directed fastener member 464. Fastener member 464 includes a neck 466 connected to the tool receiving portion 22'. Neck 466 has a width less than a width of the first slot 456. Fastener member 464 further includes a head 468 which is wider than neck 466 but narrower than a width of the second slot 458. The feed guide and tool support assembly 462 is mounted onto die platen 454 by inserting the neck 466 in first slot 456 while the head 468 simultaneously is inserted into second slot 458. A fastener 470 such as a set screw can be engaged with either the neck 466 or the head 468 to releasably fix feed guide and tool support assembly 462 to the die platen 454, with only the single fastener 470 acting to releasably couple the feed guide and tool support assembly 462 to the die platen 454.

Figure 27:
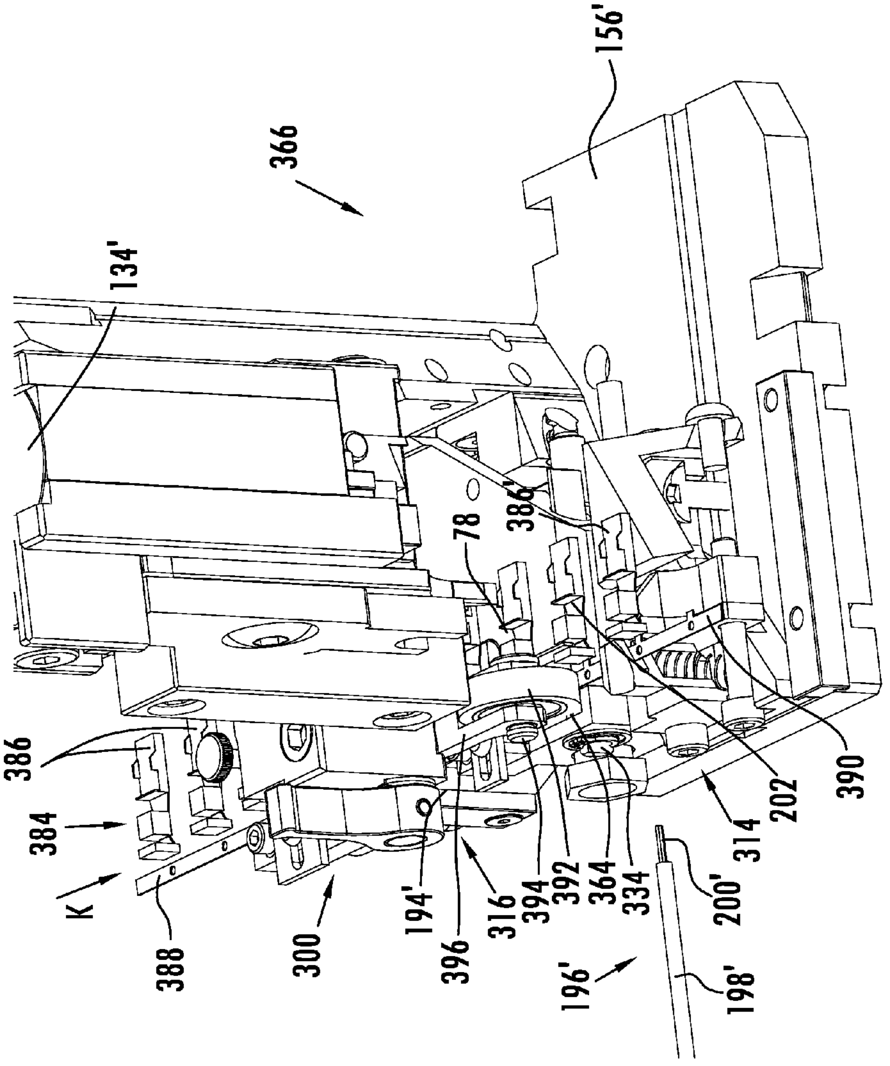
FIG. 27 is a right end perspective view of the assembly of the push feed guide and tool support assembly of FIG. 25 on a die during operation.

Referring to FIG. 38 and again to FIG. 27, the idler wheel 392 is mounted to an idler wheel support and tensioning assembly 472 which includes a mount block 474 having a bore 476 within which the cam lever shaft 400 is rotatably received. The cam lever 398 is coupled to cam lever shaft 400 using a cam lever pin 478 received in an aperture 480 of the cam lever shaft 400. A "C" clip 482 can be used to retain the cam lever shaft 400 in bore 476.

Positioned parallel to cam lever shaft 400 is a torque shaft 484 which is substantially rectangular in cross section and is rotatably received in a torque shaft bore 486 created in mount block 474. A circular end 488 can also be provided for torque shaft 484. A slot 490 is also created in cam lever shaft 400. A first force transfer member 492 includes rectangular aperture 494 created in a rectangular body 496 through which the torque shaft 484 is slidably received. A second force transfer member 498 is identical to first force transfer member 492 and is similarly received on the torque shaft 484. A first lever arm 500 extends from first force transfer member 492 and a second lever arm 504 similarly extends from second force transfer member 498.

The first lever arm 500 is received in a slot 502 of first cup member 503. Similarly, the second lever arm 504 is received in a slot 506 of a second cup member 508. A biasing force is downwardly applied to first cup member 503 by a first cup biasing member 510 such as a compression spring is received in a threaded bore 512 of mount block 474. A through bore 513 is provided to receive first cup biasing member 510. Tension is adjusted on first cup biasing member 510 by rotation of a threaded fastener 514 engaged in threaded bore 512. Threaded fastener 514 can be rotated using a tool (such as a hexagonal wrench—not shown) engaged in a fastener slot 516.

A biasing force is downwardly applied to second cup member 508 by a second cup biasing member 518 such as a compression spring received in a threaded bore 520 of mount block 474. A through bore 521 is provided to receive second cup biasing member 518. Tension is similarly adjusted on second cup biasing member 518 by rotation of a threaded fastener 522 engaged in threaded bore 520. The threaded fastener 522 can be rotated using a tool (such as a hexagonal wrench—not shown) engaged in a fastener slot of threaded fastener 522.

The idler wheel 392 is supported from an idler wheel support assembly 524 having a body 526 with a rectangular shaped bore 528 through which the rectangular shaped torque shaft 484 is received. Rotation of the torque shaft 484 therefore co-rotates the first force transfer member 492, the second force transfer member 498 and the body 526. The yoke 396 is fixed to body 526 and includes a first leg 530 having a leg aperture 532 and a second leg 534 having a leg aperture 536. The pin 394 is received through leg aperture 536, a center bearing aperture of idler wheel 392 and through leg aperture 532 and is retained by a clip 538.

Figure 38:
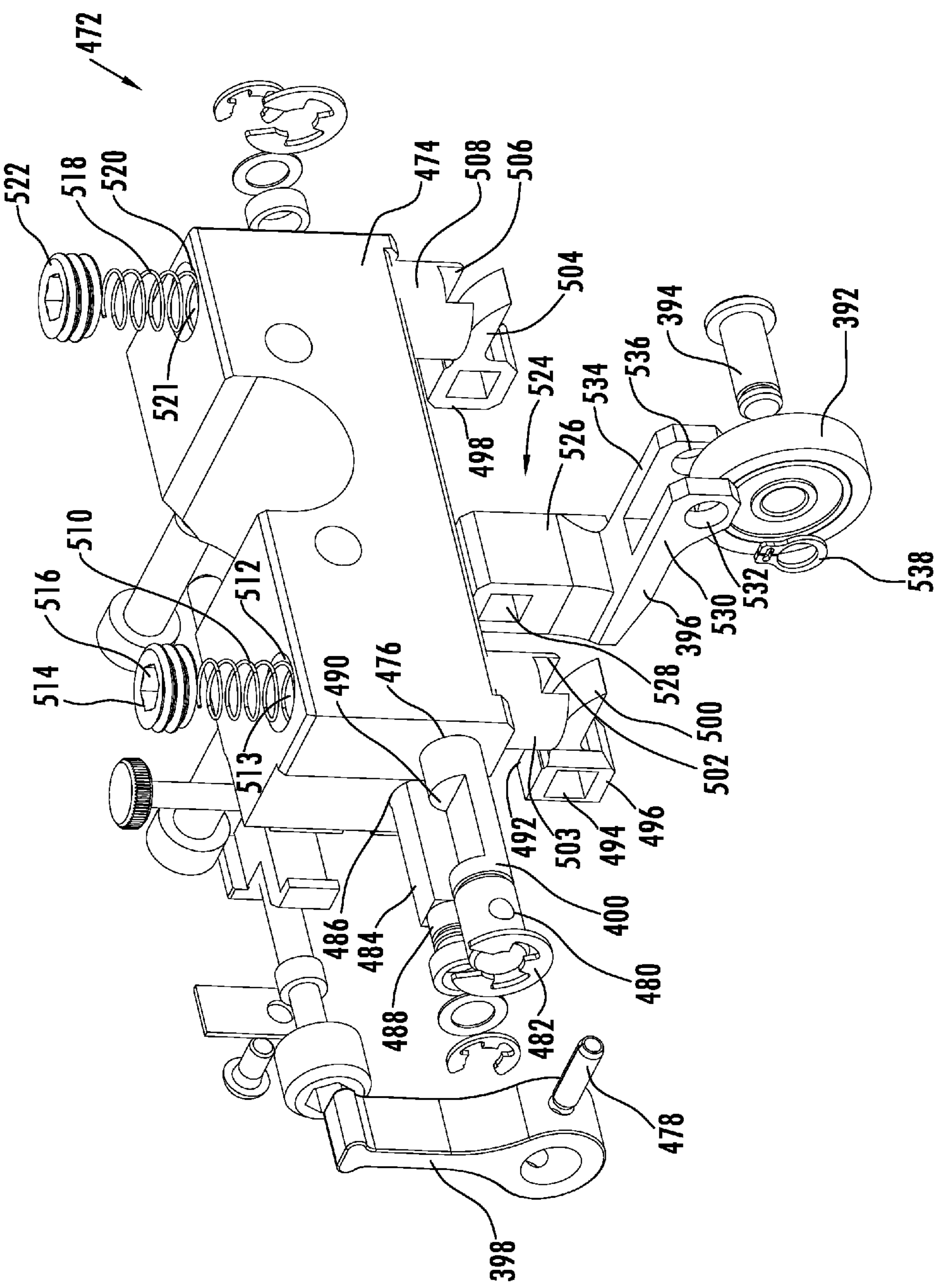
FIG. 38 is a right front exploded perspective view of an idler wheel support and tensioning assembly of the present disclosure.

Referring to FIG. 39 and again to FIGS. 27 and 38, the first lever arm 500 is normally received in slot 490 of cam lever shaft 400 by contact with first cup member 503 and retained by the biasing force of first cup biasing member 510. Rotation of cam lever shaft 400 is resisted by the geometry of slot 490 which is contacted by the flat face of first lever arm 500. The biasing force of first cup biasing member 510 is applied in a biasing direction "P". As the cam lever 398 is rotated in a clockwise rotation direction "Q", first lever arm 500 is displaced out of slot 490, to raise upwardly and rotate, compressing first cup biasing member 510. This simultaneously causes a rotation of torque shaft 484 in a counterclockwise direction of rotation "R" about a torque shaft longitudinal axis and axis of rotation 540. Counterclockwise rotation of cam lever shaft 400 rotates yoke 396 and thereby raises idler wheel 392 upwardly in a direction "S" to relieve the pressure normally applied on terminal holder strip 384.

Figure 39:
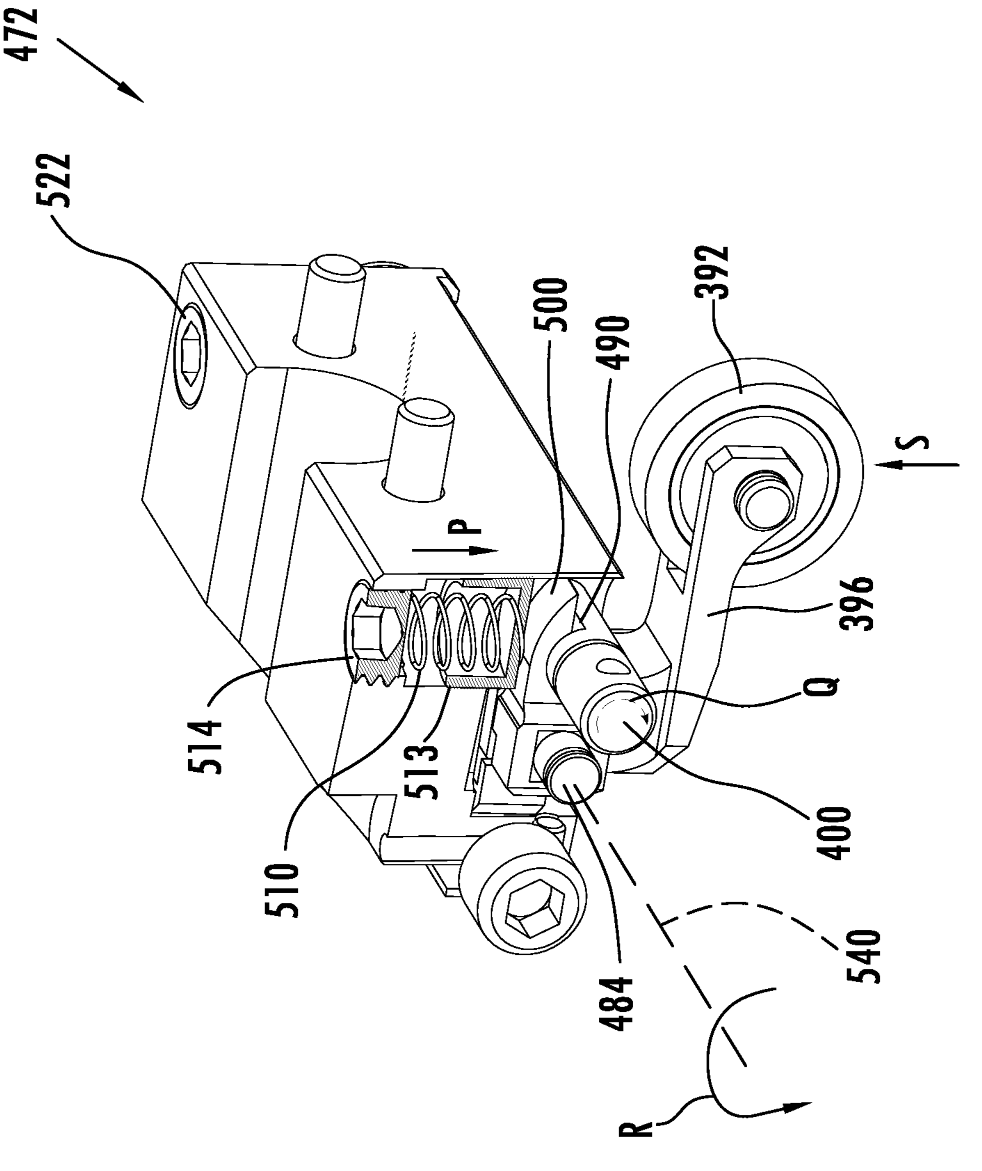
FIG. 39 is a right front perspective view of the assembled idler wheel support and tensioning assembly of FIG. 38.
Figure 40:
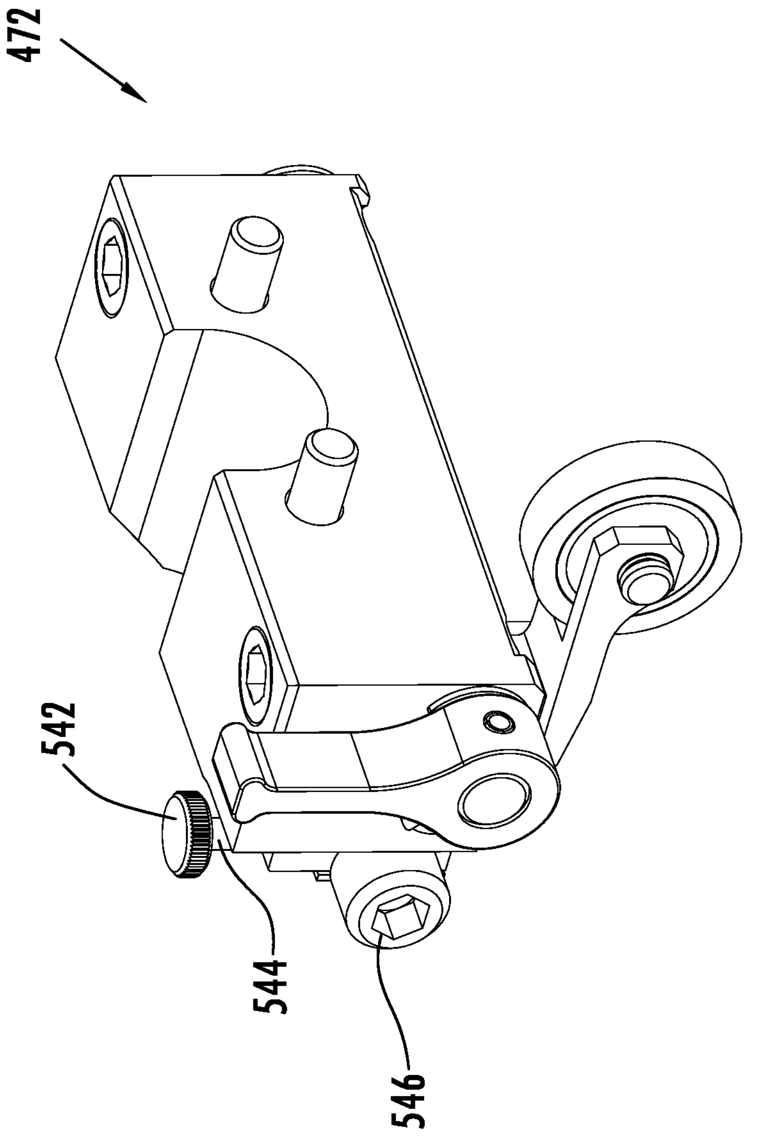
FIG. 40 is a right front perspective view of the assembled idler wheel support and tensioning assembly of FIG. 39, further showing an adjusting mechanism.

Referring to FIG. 40 and again to FIGS. 38-39, idler wheel support and tensioning assembly 472 further includes a knurled adjustment knob 542 connected to a shaft 544. Release of a fastener 546 allows rotation of adjustment knob 542 which is used for fine positioning adjustment of idler wheel support and tensioning assembly 472.

The term "homogeneous" (or homogeneously) as used herein is defined as a part, component, member, or the like (collectively the part) having all portions of the part formed of the same material and by the same process used to create the part, such as but not limited to molding including injection molding, or by forging or casting, such that no portion(s) of the part require connection to any other portion by a secondary process including but not limited to fastening, welding, adhesive bonding, mechanical connection, second molding or casting process, or the like, and the chemical properties of the part material are substantially equivalent throughout the part.

The term "non-releasable" (or non-releasably) as used herein is defined as two or more parts, components, members, or the like (collectively the part) having all portions of the part fixedly connected such as by welding, brazing, soldering, co-molding, riveting, or the like, preventing manual disassembly. The same or different materials can be used for the different parts. Use of releasable connectors such as threaded, pinned, or the like fasteners used to couple but not permanently join the parts are not included under the term "non-releasable".

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrical terminal applicator system, comprising:

a feed guide and tool support assembly defining a one-piece member including a stock guide portion joined to a tool receiving portion;

a motor positioned adjacent to the feed guide and tool support assembly;

a drive shaft received in a bore of the stock guide portion and rotated about a longitudinal axis of the drive shaft within the bore by operation of the motor;

a tool assembly mounted on the tool receiving portion and located downstream of the stock guide portion and the drive shaft; and wherein the drive shaft when rotated about the longitudinal axis of the drive shaft is positioned to engage a terminal holder strip having multiple electrical terminals to push the terminal strip holder toward the tool assembly.

2. The electrical terminal applicator system of claim 1, further including: a die;

a die platen, the feed guide and tool support assembly releasably connected to the die platen; and a tool assembly releasably secured to the tool receiving portion wherein the tool assembly includes:

a tool mount block slidably contacting the tool receiving portion and releasably fastened to the tool receiving portion; and at least one anvil releasably connected to the tool mount.

3. The electrical terminal applicator system of claim 2, further including:

a ram connected to the die; and at least one punch connected to the ram and aligned with the at least one anvil.

4. The electrical terminal applicator system of claim 2, wherein the tool assembly further includes:

a terminal cutter releasably fastened to the tool mount block; and a terminal straightener adjustably positioned with respect to the anvil and releasably secured to the tool mount block.

5. The electrical terminal applicator system of claim 1, wherein the stock guide portion further includes:

a stock guide platen; and a guide rail non-releasably connected to the stock guide platen, the guide rail operating to align a terminal holder strip holding multiple individual electrical terminals with a tool fastened to the tool receiving portion.

6. The electrical terminal applicator system of claim 1, further including a rotatable adjustment device threadably connected to the one-piece member and connected to a die by a single fastener, the rotatable adjustment device operating to adjust a horizontal position of the one-piece member.

7. The electrical terminal applicator system of claim 6, wherein the one-piece member includes a stock guide portion homogeneously connected to and elevated above the tool receiving portion such that a terminal slidably fed on the stock guide portion aligns with a tool mounted on the tool receiving portion.

8. The electrical terminal applicator system of claim 7, further including an optical sensor connected to the stock guide portion configured to indicate passage of a next terminal moving toward the tool receiving portion, the optical sensor removable together with the one-piece member when the single fastener is released.

9. The electrical terminal applicator system of claim 1, further including a single fastener releasably connecting the one-piece member to a die, wherein the single fastener has a spring loaded quick release sliding pin.

10. The electrical terminal applicator system of claim 1, wherein the stock guide portion and the tool receiving portion of the one-piece member are created as a homogeneous member.

11. An electrical terminal applicator system, comprising:

a feed guide and tool support assembly defining a one-piece member including a stock guide portion joined to a tool receiving portion;

a motor positioned adjacent to the feed guide and tool support assembly;

a drive shaft received in a bore of the stock guide portion and rotated about a longitudinal axis of the drive shaft within the bore by operation of the motor;

a tool assembly mounted on the tool receiving portion and located downstream of the stock guide portion and the drive shaft, the drive shaft when rotated about the longitudinal axis of the drive shaft is positioned to engage a terminal holder strip having multiple electrical terminals to push the terminal strip holder toward the tool assembly; and an idler wheel support and tensioning assembly having:

a mount block having a bore within which a cam lever shaft is rotatably received;

a torque shaft positioned proximate to the cam lever shaft and rotatably received in a torque shaft bore created in the mount block; and an idler wheel supported from an idler wheel support assembly having a body with a rectangular shaped bore through which the torque shaft is received, wherein rotation of the torque shaft co-rotates the body and moves the idler wheel into contact with the terminal holder strip.

12. The electrical terminal applicator system of claim 11, further including a cam lever coupled to the cam lever shaft operating to displace the idler wheel.

* * * * *